AUTOMATIC TRANSISTOR INSERTION MACHINE

Filed Aug. 17, 1964 13 Sheets-Sheet 1

INVENTORS
DANIEL W. ACKERMAN
GARY D. JOHNSON
PHILIP A. RAGARD

BY

Fidelman & Wolffe
ATTORNEYS

June 7, 1966 D. W. ACKERMAN ET AL 3,254,821

AUTOMATIC TRANSISTOR INSERTION MACHINE

Filed Aug. 17, 1964 13 Sheets-Sheet 2

INVENTORS
DANIEL W. ACKERMAN
GARY D. JOHNSON
PHILIP A. RAGARD

BY Fidelman & Wolffe
ATTORNEYS

AUTOMATIC TRANSISTOR INSERTION MACHINE

Filed Aug. 17, 1964 13 Sheets-Sheet 3

INVENTORS
DANIEL W. ACKERMAN
GARY D. JOHNSON
PHILIP A. RAGARD

BY

Fidelman & Wolffe
ATTORNEYS

AUTOMATIC TRANSISTOR INSERTION MACHINE

INVENTORS
DANIEL W. ACKERMAN
GARY D. JOHNSON
PHILIP A. RAGARD

BY Fidelman & Wolffe
ATTORNEYS

AUTOMATIC TRANSISTOR INSERTION MACHINE

Filed Aug. 17, 1964 13 Sheets-Sheet 5

INVENTORS
DANIEL W. ACKERMAN
GARY D. JOHNSON
PHILIP A. RAGARD

BY Fidelman & Wolffe
ATTORNEYS

AUTOMATIC TRANSISTOR INSERTION MACHINE

Filed Aug. 17, 1964 13 Sheets-Sheet 6

INVENTORS
DANIEL W. ACKERMAN
GARY D. JOHNSON
PHILIP A. RAGARD

BY Fidelman & Wolffe
ATTORNEYS

AUTOMATIC TRANSISTOR INSERTION MACHINE

Filed Aug. 17, 1964

13 Sheets-Sheet 7

INVENTORS
DANIEL W. ACKERMAN
GARY D. JOHNSON
PHILIP A. RAGARD

BY

Fidelman & Wolffe
ATTORNEYS

AUTOMATIC TRANSISTOR INSERTION MACHINE

Filed Aug. 17, 1964 13 Sheets-Sheet 8

INVENTORS
DANIEL W. ACKERMAN
GARY D. JOHNSON
PHILIP A. RAGARD

BY Fidelman & Wolffe
ATTORNEYS

AUTOMATIC TRANSISTOR INSERTION MACHINE

INVENTORS
DANIEL W. ACKERMAN
GARY D. JOHNSON
PHILIP A. RAGARD

BY Fidelman & Wolffe
ATTORNEYS

AUTOMATIC TRANSISTOR INSERTION MACHINE

INVENTORS
DANIEL W. ACKERMAN
GARY D. JOHNSON
PHILIP A. RAGARD

BY Fidelman & Wolffe
ATTORNEYS

AUTOMATIC TRANSISTOR INSERTION MACHINE

Filed Aug. 17, 1964 13 Sheets-Sheet 11

INVENTORS
DANIEL W. ACKERMAN
GARY D. JOHNSON
PHILIP A. RAGARD

BY Fidelman & Wolffe
ATTORNEY

INVENTORS
DANIEL W. ACKERMAN
GARY D. JOHNSON
PHILIP A. RAGARD

BY Fidelman & Wolffe
ATTORNEYS

AUTOMATIC TRANSISTOR INSERTION MACHINE

Filed Aug. 17, 1964 13 Sheets-Sheet 13

INVENTORS
DANIEL W. ACKERMAN
GARY D. JOHNSON
PHILIP A. RAGARD
BY Fidelman & Wolffe
ATTORNEYS United States Patent Office 3,254,821
Patented June 7, 1966

3,254,821
AUTOMATIC TRANSISTOR INSERTION MACHINE
Daniel W. Ackerman, Binghamton, Gary D. Johnson, Newark Valley, and Philip A. Ragard, Binghamton, N.Y., assignors to Universal Instruments Corporation, Binghamton, N.Y., a corporation of New York
Filed Aug. 17, 1964, Ser. No. 389,927
28 Claims. (Cl. 227—119)

The present invention relates to a machine for processing electrical components, particularly components each having a body section with two, three or more parallel leads extending from one face thereof, specifically to a machine for the automatic fabrication of circuit board especially when it is necessary to insert transistors into a board in various angular orientations.

Electrical components such as transistors are commonly mass produced each having the physical characteristics of a generally cylindrical body and a series of parallel leads extending from one end face thereof. These transistors are usually packaged by the manufacturers in magazines holding ten or more in a line and in the same rotary orientation. Thus the magazine packaged components come ready for loading directly into an automatic insertion machine, the individual components needing only a final lead straightening operation before insertion.

Although a number of machines exist for the automatic insertion of axial lead components including those packaged in magazines, very little has been done in the field of transistors. One reason for this apparent lack of activity is the problem of handling components such as transistors, which have their leads extending down from the lower face thereof. When handling axial lead components, the leads remain axially extended until insertion, allowing the components to bodily abut the chute mechanism without danger of lead deformation. In a transistor inserter, all guideways must be designed to prevent the component leads from touching anything that could deform them.

Another problem is that of versatility of component design. Although axial lead components are fairly well standardized by the industry at this time, many relatively new companies, make transistors, each of a slightly different configuration and packaged in different magazines. The transistor insertion machines now in service can each handle only the products of one manufacturer, such machines not being economically feasible for many applications since a particular design transistor may be used only in small batch lots. It is also advisable to permit the machine to be adaptable to bowl feed where large numbers of transistors are required.

Also in striving for compactness and miniaturization it is often impractical to have all the transistors, to be inserted in a circuit board, oriented in the same angular position. With prior devices it has been necessary to have, in an assembly line, an insertion machine set up for each desired angular position because the machines in use were not capable of selectively rotating transistors prior to insertion. Furthermore it is not usually feasible to rotate the individual boards.

It is a general object of the present invention to provide a machine that will meet all of the above desiderata.

A more specific object of the present invention is the provision of a machine which will insert transistors or the like into a circuit board in one of several discrete angular positions.

Another object of the present invention is to provide a transistor insertion machine having a means for straightening and trimming the leads of each transistor before insertion as the transistors move along a guide means from a magazine.

A further object of the present invention is to provide a transistor insertion machine adaptable to accommodate more than one design of transistor.

A still further object of the invention is to provide an automatic insertion machine for receiving transistors from differently designed magazines or bowl feed devices and guiding them to an insertion head which is capable of inserting the leads of the individual transistor into a circuit board.

Others objects and the nature and advantages of the present invention will be apparent from the following description taken in conjunction with the accompanying drawings, wherein.

*General description of the first embodiment*

Figure 1:
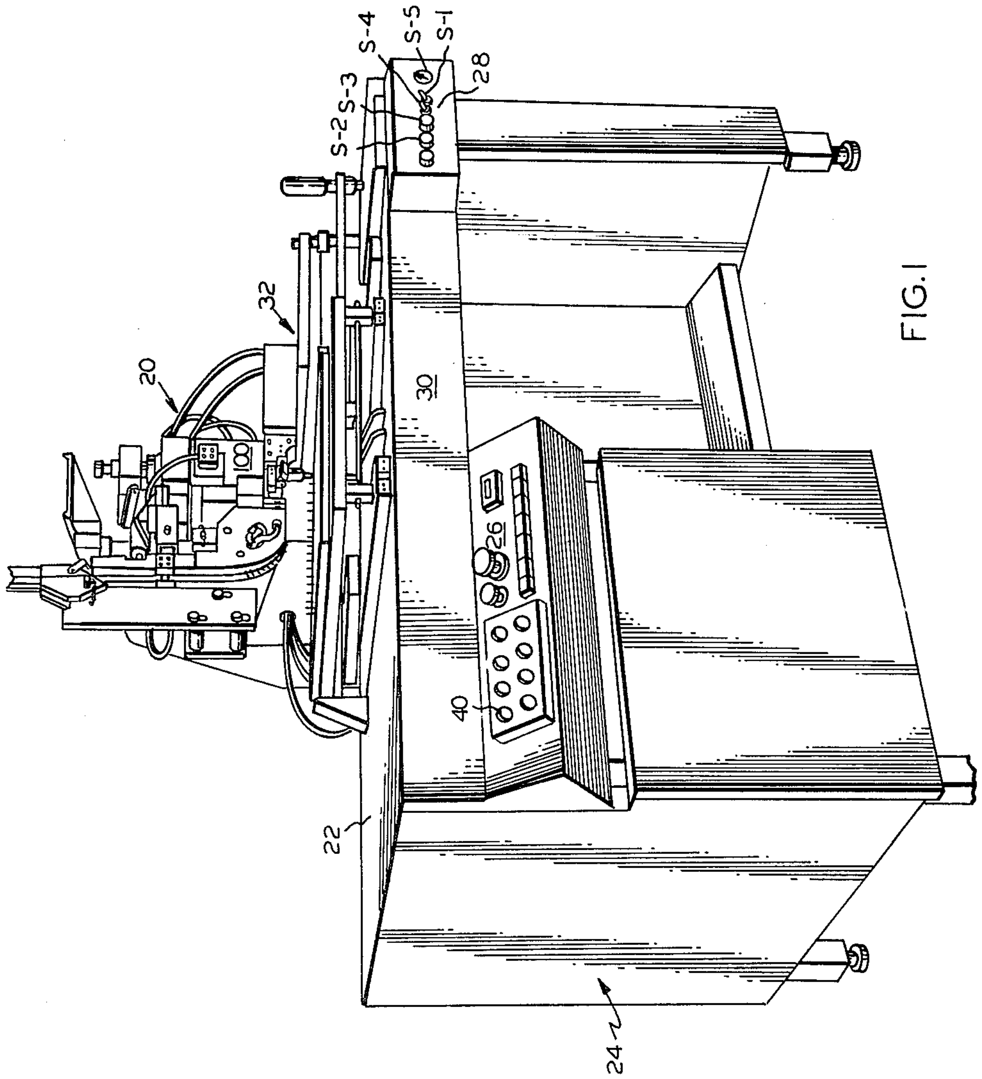
FIGURE 1 is a perspective illustrative view of a console for mounting an insertion machine and having control panels therefore.

A first embodiment of the insertion machine, generally designated 20, as shown in FIGURE 1, is mounted on the top surface 22 of a work table 24 having control panels 26 and 28 affixed to the front vertical face 30 thereof. Affixed within table top 22 beneath the insertion machine 20 is an indexing device 32 for automatically indexing printed circuit cards 12, and locking each card, in turn, in place under the insertion machine 20. The card indexing and locking means is conventional and does not represent a portion of the present invention.

Figures 2, 2A:
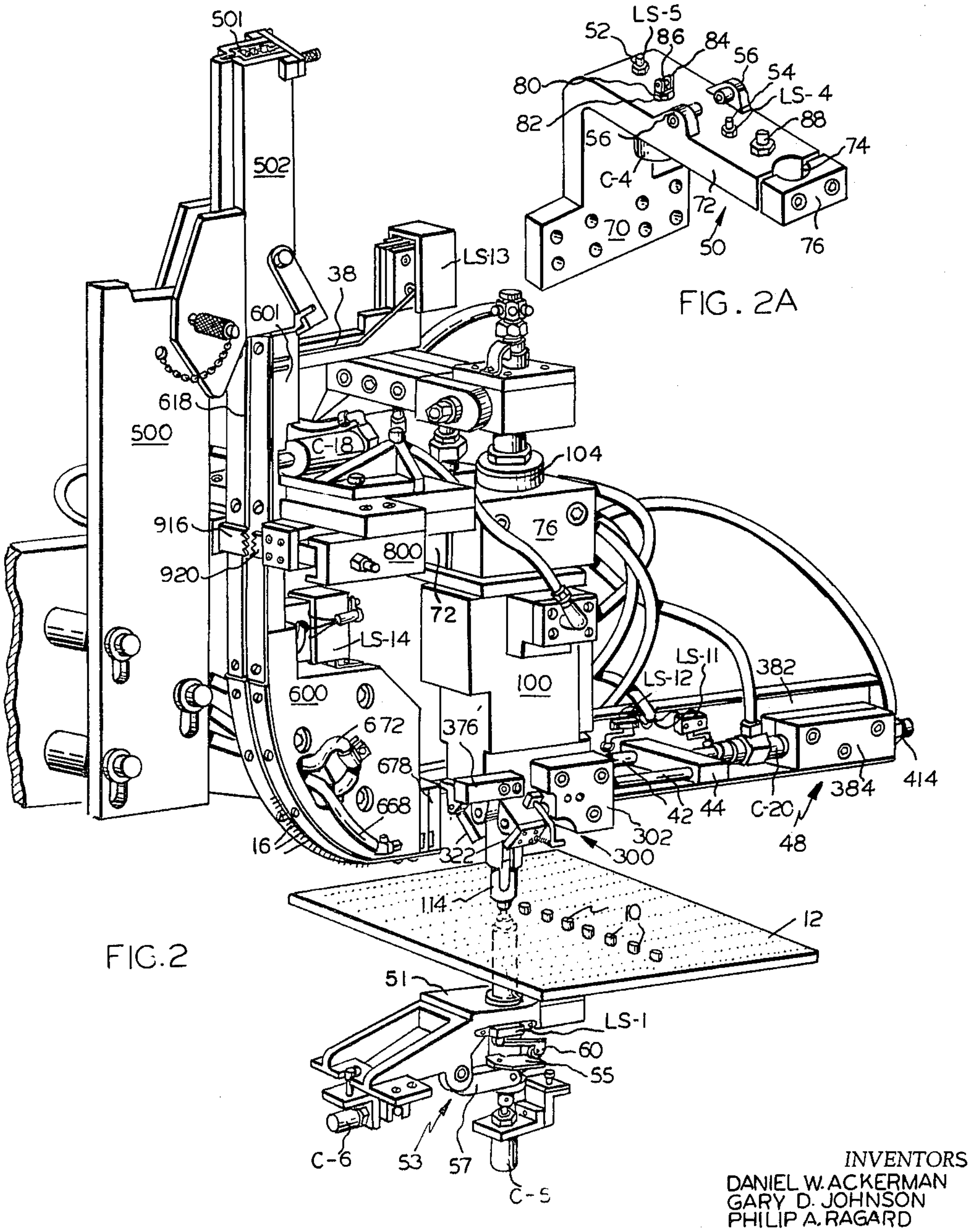
FIGURE 2 is a close-up view of the insertion machine shown in FIGURE 1 with several parts removed for clarity.
FIGURE 2A is a perspective view of the mounting clamp used to fix the insertion machine to the rear of the console.

As shown in closeup in FIGURE 2, the first embodiment of the insertion machine 20 consists of a number of units or sections bolted together to form an integrated machine. A transistor magazine mounting section, generally designated 500, feeds transistors 10 from a magazine 501, held within a magazine holder 502, into a chute section, generally designated 600. A transistor lead straightening and trimming section, generally designated 800, encircles the upper extension 601 of the chute section 600 for straightening, and cutting to proper length, the leads 16 of the transistors 10 as they drop down the upper chute extension 601, while an escapement, generally designated 678, is mounted to the lower end of the chute section 600 to meter out one transistor 10, at a time. A transistor inserter, generally designated 100, reciprocatably and rotatably mounts a vertical insertion tube 114 extending therethrough and furthermore has a pivot block subassembly, generally designated 300, and a feed mechanism, generally designated 48, bolted to the lower portion thereof. The inserter 100 is fixed adjacent the lower end of the chute section 600 with the pivot block assembly 300 adapted to be reciprocated by the feed mechanism 48 to pick up individual transistor 10 from the escapement 678 and transport them, one at a time, to a position beneath the insertion tube 114 which at this times moves downward, capturing the transistor 10 in the lower end thereof, and driving it through the pivot block assembly 300 into the circuit board 12. A clinching mechanism, generally designated 53 (disclosed in the copending application Ser. No. 314,255, filed October 7, 1963, in the name of Joseph D. Ahearn, for "Transistor Clincher") for radially clinching the leads 16 of the transistor 10 as it is set into the circuit board 12 by the insertion tube 114, fixed within the table top 22, consists of a pair of vertically nesting cylinders (inner and outer lead formers) coaxially arranged with respect to the insertion tube 114. A mounting clamp 50 (FIGURE 2A) may be fixed to the back of the table 24 in any suitable manner (not shown), such as by means of an integral plate 70, having a horizontal leg 72 extending across the table, parallel to the top surface 22. A cylindrical guide portion 104 of the inserter 100 is held between the shaped end 72 of the clamp 50 and the shaped face 74 of a clamping block 76. A pivoted arm (FIG. 7), for reciprocating the insertion tube 114, is fulcrumed by the flanges 56 positioned midway along the horizontal leg of the clamp 50.

The transistors 10 pass from a magazine held in a magazine holder 502 down through the upper chute section 601, and the interposed transistor lead straightening and trimming section 800. After the straightening and trimming of the transistor leads 16 in the straightening and trimming section 800 the transistors 10 drop through the main chute section 600 below. If either the upper chute section 601 or the main chute section 600 is not completely filled with transistors, switches LS–13 or LS–14, one located in each of the chute sections 601, 600 will be actuated causing a yellow light 40 on the control panel 26 (FIGURE 1) to light or the light 40 may also be an indication of a jam in the transistor lead straightening and trimming section 800. The transistors 10 are then fed, one at a time through the escapement 678 which allows the transistors to be picked up singularly for insertion. Air jets in the chute section 600, adjacent the escapement 678 supplied with air pressure from lines 668 and 672, assist the transistors 10 through the escapement 678. A fluid system in conjunction with appropriate electrical circuitry (both to be explained later) actuates the various movable elements such as the straightening blades 916 and 920 of the transistor lead straightener 800, the feed mechanism 48 for the pivot block assembly 300, the blades of escapement 678, and the insertion tube 114, in timed relationship.

Making up the pivot block assembly 300 are a pair of pivot blocks 322 each journalled on a circular shaft 42, the shafts 42 being slidably carried in a pivot assembly mounting block 302. The shafts 42 are mounted in a frame member 44 of the feed mechanism 48, being reciprocated by a feed rod 414 of a fluid actuator or slave cylinder C–20 mounted on a channel member extension 382 by a mounting block 384. As the fluid actuator C–20 starts to drive the pivot block assembly 300 outward to pick up a transistor 10, it cycles the escapement 678. As the pivot block assembly 300 nears the escapement 678 it operates to close the escapement 678 and traverse the slave cylinder C–20, sending the feed rod 414 back. The straightener section 800 is also controlled by the movement of the feed mechanism 48 and is actuated once each cycle.

When the feed rod 414 is completely retracted, the insertion tube 114, and the included vacuum tube 198 (FIG. 10) move downward to the point where the transistor 10, now held in the retracted pivot block assembly 300, is gripped by the vacuum tube 198 as the insertion tube 114 cams the pivot blocks a part on its way toward the circuit board 12. As the insertion tube 114 continues in its downward movement the insertion tube 114 continues downward, with the captured transistor 10, it is rotated to position the transistor 10 is a preset angular position. The support rod of the clincher mechanism moves upward to support the board from below as the insertion tube 114 moves down. After the transistor 10 is inserted into the board 12, the formers of the clinch mechanism move upward to radially clinch the leads 16. The insertion tube 114 and the support rod and formers of the clinch mechanism 53, retract at this point so that the feed mechanism 48 may be retracted to pick up another transistor 10.

*General description of the alternate embodiment*

Figure 3:
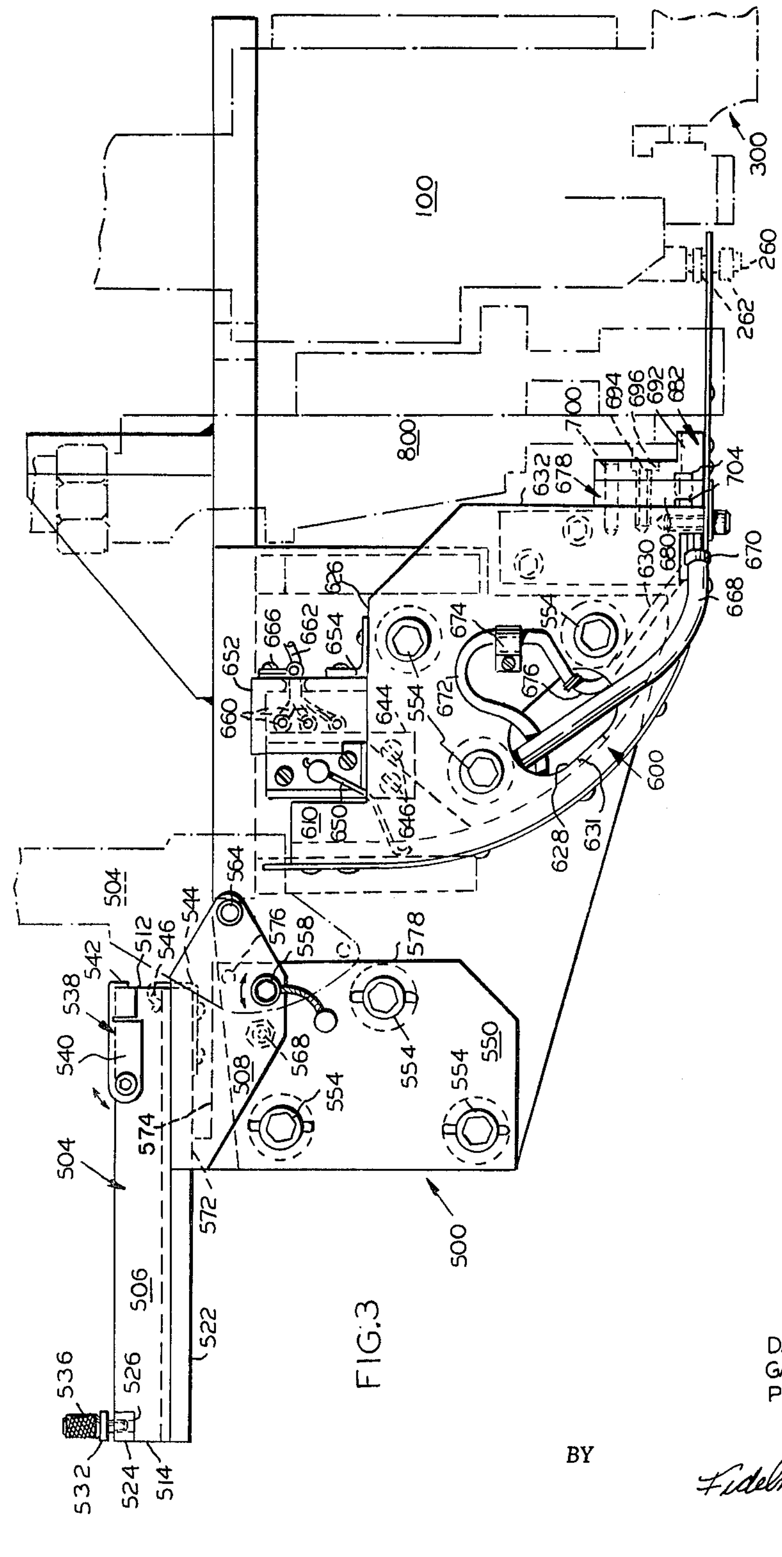
FIGURE 3 is a side plan view of a second, more compact embodiment of the insertion machine with the transistor lead straightening and trimming section and the inserter head shown in phantom to more clearly illustrate the transistor magazine mounting and chute sections.
Figures 4, 9:
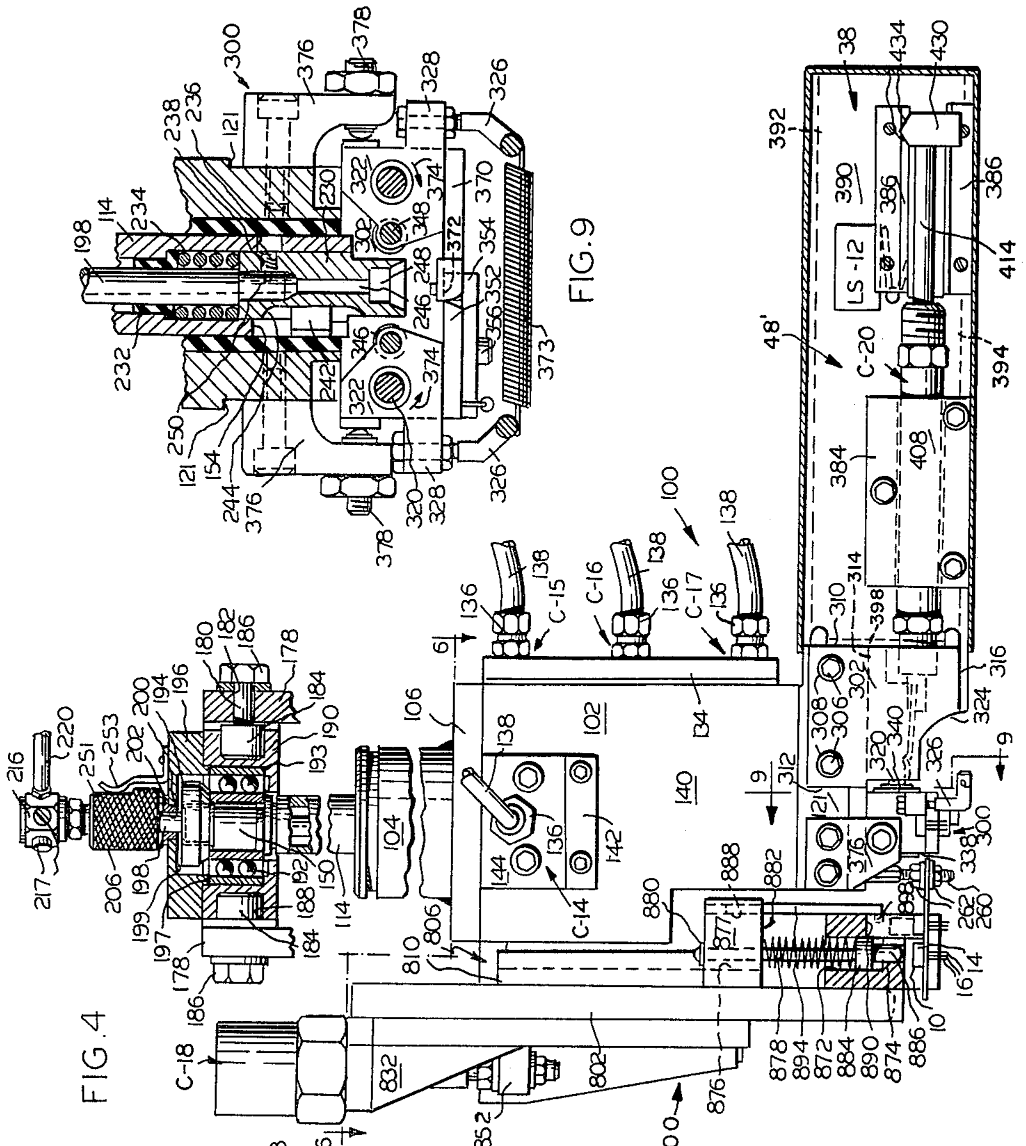
FIGURE 4 is a side plan view of the insertion machine of the embodiment of the invention shown in FIGURE 3 illustrating the transistor lead straightening and trimming section and the insertion head shown in phantom in the former figure.
FIGURE 9 is a sectional side view of the inserter section taken along line 9—9 of FIGURE 4.

A second simpler embodiment of the insertion machine 20 is shown in FIGURES 3 and 4. In FIGURE 3 is shown the transistor magazine mounting section 500 and the chute section 600 in detail and the transistor lead straightening and trimming section 800, and the inserter section 100, in phantom. FIGURE 4 illustrates the transistor lead straightening and trimming section 800 and the inserter section 100 in detail. In this embodiment the parts are slightly rearranged. The switch LS–13 and the upper chute section 601 may be omitted and the transistor magazine mounting section 500 dispenses transistors 10 directly into the chute section 600, while the transistor lead straightening and trimming section 800 has been inserted between the escapement 678, at the end of the chute section 600, and the inserter 100. The subsequent description will follow the specific arrangement of the elements in the second embodiment, carefully pointing out where the second embodiment differs from the first embodiment.

*The inserter section*

Figures 6, 8, 11:
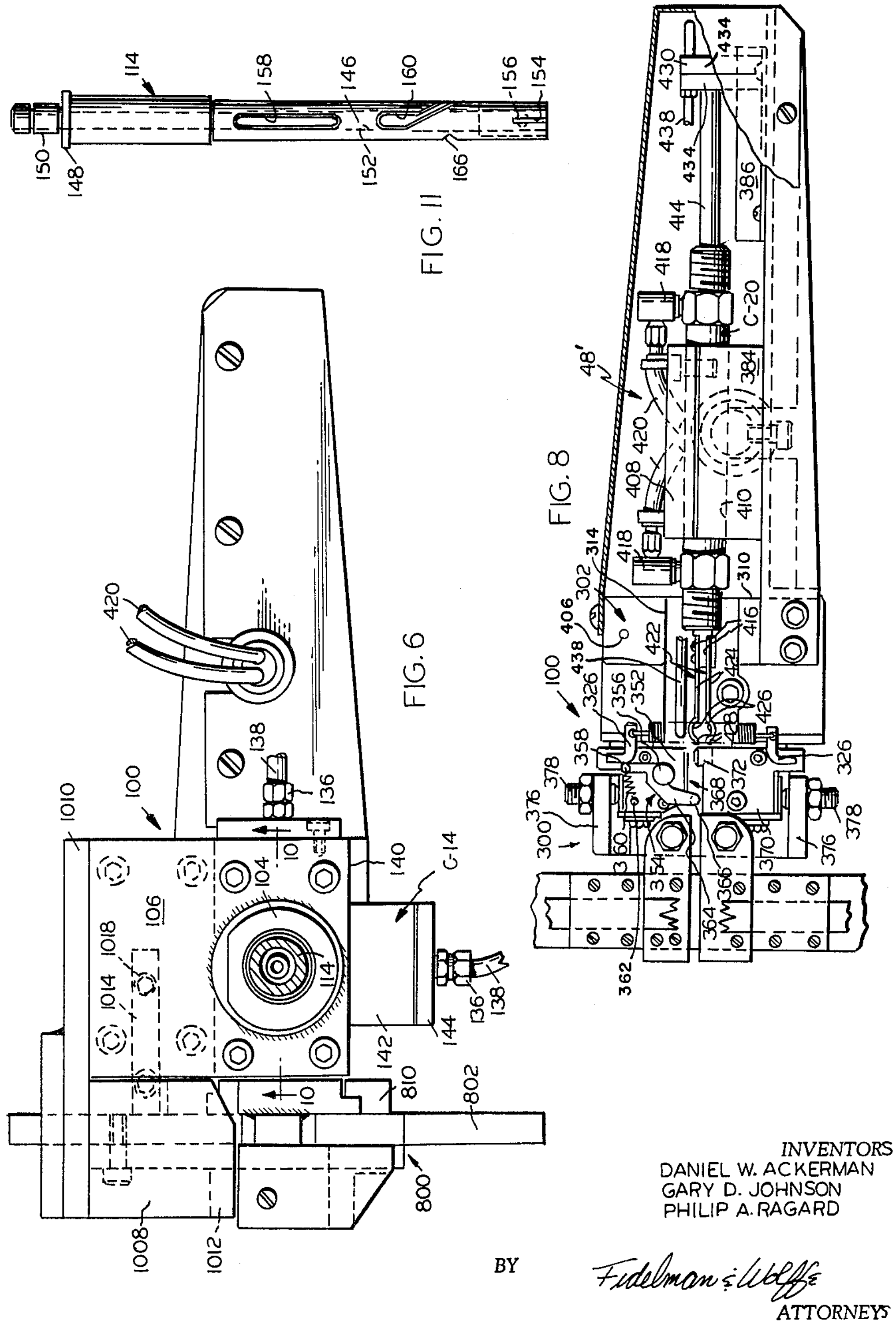
FIGURE 6 is a top plan view of the section of the insertion machine taken along line 6—6 of FIGURE 4.
FIGURE 8 is a bottom plan view of the section of the insertion machine shown in FIGURE 4 with the bottom plate broken away to disclose the inner mechanism.
FIGURE 11 is a side view of the insertion tube, fitting in the inserter section, and illustrating the position-determining cam slots therein.

FIGURE 4 shows the inserter head 100 in combination with the transistor lead straightening and trimming section 800, arranged so that the leads 16 of the transistor 10 are straightened and trimmed just before insertion. The inserter head 100 comprises, in part, a generally rectangular inserter body section 102, capped by a cylindrical guide 104 having a flange 106 welded to the lower end thereof and bolted to the upper face of the inserter body 102. A vertical composite central bore 108 (FIG. 10) of circular cross-section, extends the length of the body section 102 and the cylindrical guide 104 and is coaxial with the latter. Upper and lower concentric sleeve bearings 110 and 112, respectively, force fitted into the ends of the central bore 108, slidably and rotatably journal the insertion tube 114, of circular cross-section. A series of three stepped cylinder bores 116 forming slave cylinders C–15, C–16, and C–17 are arranged in a vertical line on a planar rear face 118 of the body section 102, extending perpendicularly from the rear face 118 radially into the central bore 108. A camming piston, generally designated 120, is slidably mounted in each cylinder bore 116 (as shown only in upper and lower bores 116) by a cylindrical camming finger 124 mounted on the inner face of the piston head 126 and received into a sleeve bearing 122, which is force fitted into the inner end of the cylinder bore 116 adjacent the central bore 108. The piston head 126 is located in the outer end of the bore 116 with an O-ring 128 fitting in a circumferential groove 130 in the piston head 126 forming an air tight seal with the cylindrical bore 116. Each camming piston 120 is biased outwardly by a coil spring 132, encircling the camming finger 124, and compressed between the outer face of the bearing 122 and the inner face of the piston head 126. The three camming pistons 120 are held within their respective bores 116 by a rear face cover plate 134 (FIGS. 4 and 6) bolted over the rear face 118 of the body section 102. Screwed into a tapped hole through the cover 134 into the outer end of the bore 116, is a coaxial fitting 136 having an air hose 138 fixed on its outer end.

A cylinder block 142 is bolted to a side planar face 140 of the body section 102 (FIGS. 4, 6 and 7), with the upper face of the block 142 lying in the same plane as the top surface of the body section 102. A stepped composite bore (not shown), extending through the cylinder block 142 and the body section 102, perpendicular to the side face 140 thereof, and radially into the central bore 108, is identical with the bores 116 in the rear face 118 of the body section 102 forms a slave cylinder C–14 and also contains a piston 120 biased by a spring 132. A side face cylinder block cover plate 144 is bolted over the outer vertical face of the side face cylinder block 142, containing the piston 120 therewithin, and having a fitting 136 screwed into a tapped hole through the cover 144 for mounting an air hose 138 threaded on the outer end thereof.

In the lower end of the other side face 173 of the body section 102 is a detent holder 168 (FIG. 13) screwed into a tapped hole 170, extending radially inward to the lower end of the bore 108, the detent holder 168 having an inwardly biased ball detent 172 located in the inner end thereof in the bore 108. A nut 174 is threaded on the outer end of the detent holder 168 and run down tightly against the side face 173 of the inserter body section 102 to hold the detent holder 168 in its adjusted position against vibration.

Figures 10, 12, 13:
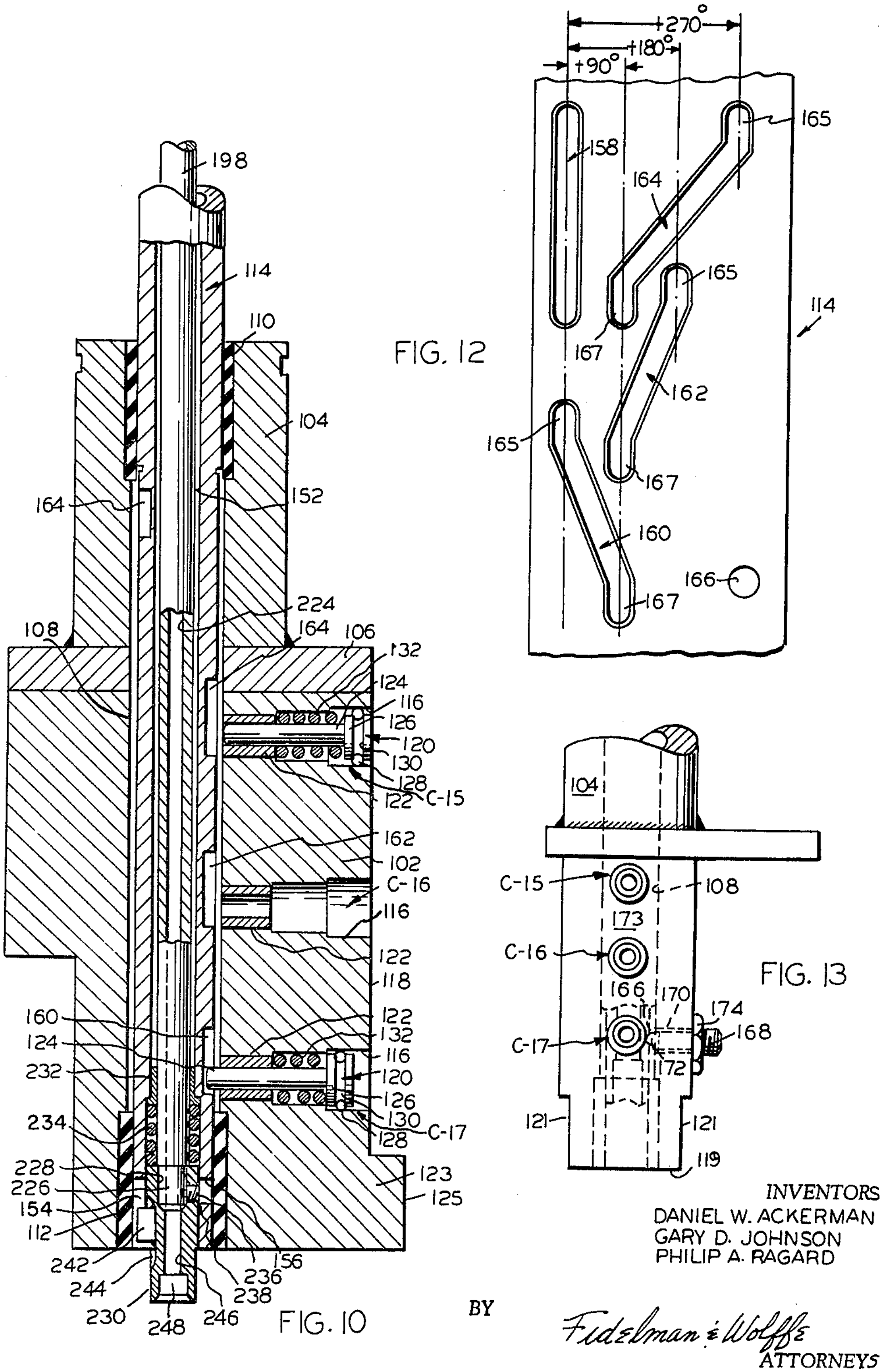
FIGURE 10 is a side sectional view of the inserter taken along lines 10—10 of FIGURE 6 showing the cylinder block, insertion tube, and vacuum tube.
FIGURE 12 is an unfolded view of a portion of the surface of the insertion tube illustrating the cam slot configuration used to obtain angular positioning of the transistors.
FIGURE 13 is a rear view of the cylinder block, as shown in FIGURE 7, illustrating the detent means used to hold the insertion tube in its deactuated position.

The insertion tube 114 (FIG. 11), designed to be slidably and rotatably journalled in bore 108 of the inserter body 102, consists of a lower cam section 146, an intermediate flange 148, and an upper mounting section 150 with a coaxial bore 152, of circular cross-section. A vertical keyway 154 is provided in tthe side of the tube 114 and extends from the outer surface through to the bore 152 and extends upward from the lower end of the tube, part way into the lower cam section. Diametrically opposed from the upper end of the keyway 154 is a small radial hole 156 extending from the bore 152 to the surface of the tube 114. The cam section 146 of the insertion tube 114 has a series of four cam slots 158, 160, 162 and 164 (as seen in FIG. 12) cut in the outer surface of the tube 114; cam slot 158 being vertical, cam slot 160 slanting downwardly to the right and extending 90° around the tube 114, cam slot 162 slanting oppositely to the cam slot 162 and also extending 90° around the tube 114, and the cam slot 164 slanting in the same direction as cam slot 164 and extending 180° around the tube 114. All four cam slots extend the same vertical distance up the tube 114, slots 160, 162, and 164 having their lower ends in the same vertical line while the lower ends of slots 158 and 164 are in the same horizontal plane perpendicular to the axis of the tube 114. Each of the slanted cam slots 160, 162, and 164 has upper and lower vertical slot sections 165 and 167 respectively. A circular indentation 166 is formed in the outer surface of the tube 114 diametrically opposite the lower end of the slot 160.

The insertion tube 114 is reciprocated within the bore 108 of the body section 102 by the pivoted arm 176 (FIG. 7) fulcrumed between the flanges 56 on the upper surface of the horizontal leg 72 of the mounting clamp 50. As shown in FIG. 2A, there is attached beneath the rear end of a leg 72, across an aperture 80, a slave cylinder C–4 having a piston rod 82 extending vertically through the aperture 80. The upper end of the piston rod 80 has a clevis 84 formed thereon, connecting the piston rod 82 to the pivoted arm 176 by means of a pin 86 extending between the arms of the clevis 84 and a horizontal slot in a depending flange (not shown) of the arm 176 which lies between the arms of the clevis 176. A vertically adjustable abutment rod 88 is fixed to the top surface of the leg 72 of the mounting clamp 50 to strike an abutment plate 90 (FIG. 7) recessed into the lower surface of the pivoted arm 176, when the arm 176 has been pivoted the desired amount.

Fixed to the end of the lever 176, adjacent the inserter head 102, is a clevis 178 (FIGS. 4 and 7) mounting a pair of inwardly extending pins 180 in coaxial holes 182, one in each of the bifurcated arms. Coaxially journalled on the inner ends of each pin 180, abutting the inner face of the clevis 178, (FIG. 4) is a roller 184 with a nut 186 threaded on the outer end of each pin 180 to secure the roller 184. The rollers 184 slide in slots 188 formed in opposite sides of a driving block 190 journalled on the upper mounting section 150 of the insertion tube 114 forming a pin and slot connection therewith. The driving block 190 is journalled on the insertion tube 114 by a roller bearing 192 located in the hollow interior thereof. The outer face of the bearing 192 is held in the block 190 between a raised circular boss 193 in the lower face of the hollow interior 195 thereof and the raised circular boss 197 in the upper face of an interior hollow 199 in a block cover 196 bolted to the upper face of the driving block 190. The inner face of the bearing 192 is rigidly held on the insertion tube 114 by the integral intermediate flange 148 on the tube 114 below the block 190 and a lock nut 194 threaded on the top of the insertion tube 114 above the block 190 within the cover 196.

Figures 7, 32:
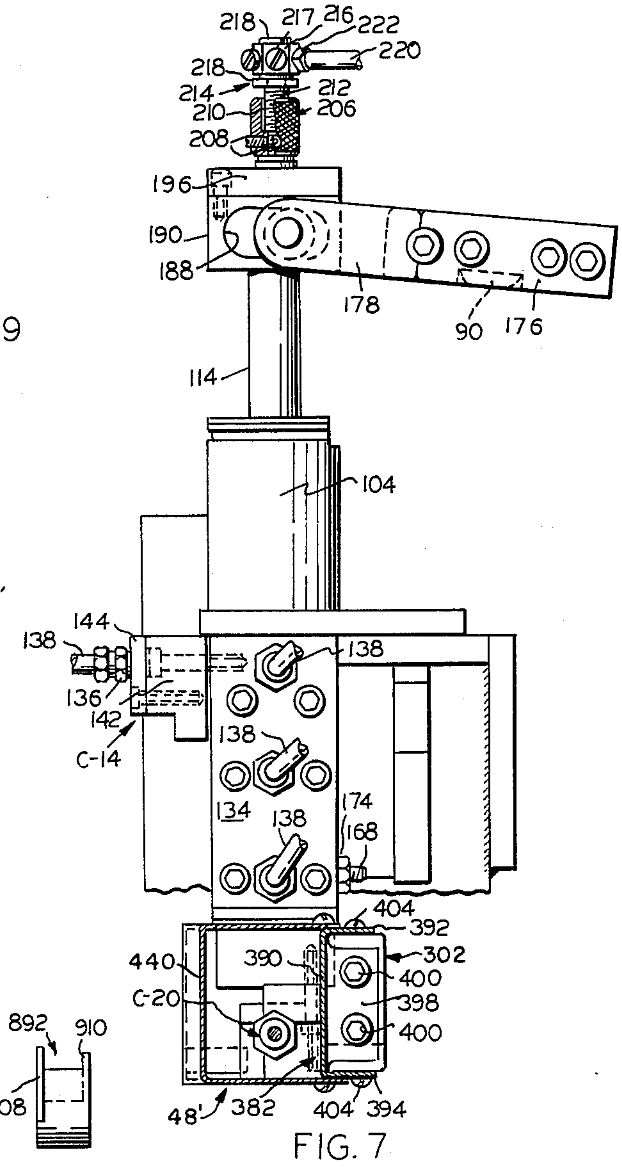
FIGURE 7 is a rear view of the section of the insertion machine shown in FIGURE 4.
FIGURES 32 and 33 are end views of the meter wheel illustrating the cutout sections thereof.

A vacuum tube 198 is reciprocably mounted in the bore 152 of the inserter tube 114 and extends upwardly thereof through the driving block 190 and the bolted on cover 196, journalled in a coaxial antifriction sleeve bearing 202 which is force-fitted in a hole 200 in the block cover 196. As shown in FIG. 7, the upper end of the vacuum tube 198, above the block cover 196, is capped by a cylindrical adapter 206 having a coaxial bore 204 in its lower end for accepting the vacuum tube 198, and a pair of set screws 208 threaded through the surface of the adapter, 90° apart, holding the vacuum tube 198 fixedly within the bore 204. An upper tapped section 210 of the bore 204 receives the lower threaded end 212 of a pneumatic swivel fitting 214 journalling a rotatable ring-like head 216 between a pair of flanges 218 on the upper end of the fitting 214. A flexible pneumatic hose 220 is threaded into one of a series of tapped ports 222 in a hexagonal face of the head 216 of the fitting 214 while the remainder of holes are closed off by threaded plugs 217. Thus, there is formed a continuous air passage from vacuum tube 198 through the adapter 206 and the fitting 214 to air hose 220.

The necked down lower end section 226 of the vacuum tube 198 fits snugly into a coaxial bore 228 in a large diameter cylindrical vacuum cup 230 which in turn rides in the bore 152 of the insertion tube 114. The vacuum cup 230 is held firmly on the necked down portion 226 of the vacuum tube 198 by a threaded pin 236 screwed into the tapped hole 238 in the upper end of the vacuum cup 230 with a necked down tip extending into a corresponding hole 250 in the portion 226 of the vacuum tube 198, being assembled through the aperture 156 in the inserted tube 114. Within the lower end of the bore 152 of the insertion tube 114, above the vacuum cup 230, is a sleeve bearing 232 for guiding the lower end of the vacuum tube 198. A coil spring 234 encircles the lower end of the vacuum tube 198, below the sleeve bearing 232 and is compressed between the lower face of the sleeve bearing 232 and the upper edge face of the vacuum cup 230, forcing the vacuum cup 230 downward to a point at which the lower half of the vacuum cup 230 lies below the lower end of the insertion tube 114 when at rest. The vacuum tube 198 is prevented from dropping further down into the insertion tube 114 by the adapter 206 fixed on its upper end which abuts the upper face of the driving block and cover assembly 190, 196 axially fixed on the insertion tube 114. The bore 224 of the vacuum tube 198 extends down through the vacuum cup 230 through a central bore 246 therein and ends in an enlarged hollow portion 248 opening out of the lower face of the vacuum cup 230 and shaped to fit snugly over the cylindrical body 14 of a transistor 10.

Several devices are used to hold the moveable elements in proper relation to each other. A key 242, welded into a vertical slot 244 in the surface of the vacuum cup 230, rides in the slot 154 in the lower end of the insertion tube 114 to prevent relative rotation of the vacuum tube 198 with respect to the insertion tube 114 while permitting a slight amount of reciprocating motion. A flat face 251 (FIG. 4) is cut into the cylindrical surface of the adapter 206 and is resiliently held in a particular angular position by a spring plate 253 riveted to the upper face of the adjacent block cover 196 and biased against the flat 251 in the rest position of the insertion tube 114. Tending to hold the insertion tube 114 in the upper rest position, within the inserter body section 102, is the detent ball 172 (FIG. 13) which is biased into the circular indentation 166 in the insertion tube 114. In the lower position of the insertion tube 114 a screwdriver or Allen wrench may be inserted into the hole 156 to remove the pin 236. The vacuum cup 230 may then be replaced with one having a hollow interior 248 of the proper configuration to fit a particular manufacturer's transistors.

The transistors 10 are inserted into a circuit board 12 in one of four positions, spaced 90° apart, by the inserter head 100. When a transistor 10 is placed directly beneath the insertion tube 114, it is driven downward by actuation of the pivoted lever 176. A vacuum is applied to the shaped hollow portion 248 of the vacuum cup 230 through the hose 220 to hold the head 14 of the transistor 10 tightly within the cup 230. Air pressure is vented simultaneously from three of the four hoses 138 to leave actuated only the camming piston 120 corresponding to the cam slot that will cause the desired angular movement. By actuation of the piston 120, included within the cylinder block 144, and driving it inwardly into the camming slot 158, the insertion tube 114 is driven straight down to insert a transistor 10 into the circuit board 12 in the same angular position as it was when delivered to the inserted head 100. When the lowest of the three in-line pistons 120 is moved into its respective slot 160, the insertion tube 114 is rotated 90° counterclockwise (when observed from the top), corresponding to 270° of clockwise rotation, as the tube 114 is depressed. The actuation of the central piston 120 into its respective slot 162 results in a rotation of the insertion tube 114 90° in a clockwise direction. The actuation of the upper piston 120 into its respective slot 164 in the inserter tube 114 results in 180° clockwise rotation of the tube 114.

The first portion of the downward travel of the inserter tube 114 regardless of which piston 120 is actuated, is without rotation due to the lower vertical slot sections 167 of all of the slanted cam slots. During this portion of the stroke, the vacuum cup 230 moves down over the body 14 of the transistor 10 with the body 14 filling the shaped hollow 248, and thereafter being held in the hollow 248 by the applied vacuum. When the transistor 10 is securely held in vacuum cup 230 the insertion tube 114 continues to move downward through the second phase of its movement during which the transistor 10 may be angularly rotated to a preselected position. At the lower end of the second phase of the insertion tube 114's downward movement the lower ends of the downwardly extending leads 16 of the transistor 10 approached prepunched lead holes in the circuit board 12. The insertion tube 114 then goes into a third phase of its downward movement, again moving vertically downward controlled by the upper vertical slot sections 165. The leads 16 of the transistor 10 are inserted into the lead holes in the circuit board 12 and the insertion tube 114 continues down until the transistor body 14 is held tightly against the board 12 with the spring 234 compressed to telescope the vacuum tube 114 into the insertion tube 114 and resiliently bias the transistor 10 into engagement with the board 12. The leads 16 of the transistor 10 are simultaneously clinched in an outwardly extending pattern by the clinching mechanism consisting of a central support rod and a pair of lead formers arranged beneath the circuit board 12 as disclosed in our copending patent application, previously cited.

Coincident with the clinching operation, the vacuum applied to the vacuum tube 198 is replaced by air under pressure, releasing the transistor 10. After the clinching operation is completed, the insertion tube 114 and the vacuum tube 198 are retracted by the lever 176, pivoting upwardly against the driving block 190. During the upward movement of the insertion tube 114, the same piston 120 in the inserter body section 102 remains actuated, bringing the tube 114 back to its original rest position. The insertion tube 114 is held against rotary motion with respect to the body section 102, during rest periods when the air pressure and electricity may be shut off by the spring 253 biased against the flat face 251 of the adapter 206 fixed to the upper end of the vacuum tube 198 as previously explained.

Figure 14:
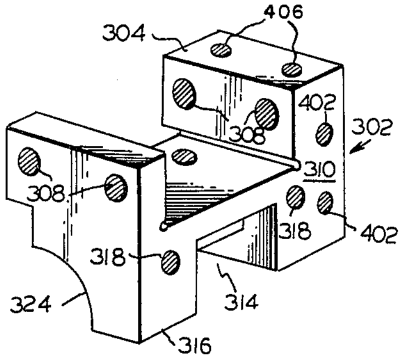
FIGURE 14 is a perspective view of the main mounting block of the pivot block assembly fixed beneath the inserter head.

The pivot block assembly 300' is mounted beneath the inserter body section 102 and is adapted to hold a transistor 10 securely, with the transistor body section 14 directly beneath the vacuum cup 230 so that the transistor 10 may be picked up by the inserter 100 for insertion in a circuit board 12 aligned beneath the pivot block assembly 300. A main mounting block 302 (FIGS. 4 and 14) of the assembly 300 is fixed to the lower end 119 of the inserter body 102. The block 302 has a pair of upper integral flanges 304 fitting into a pair of opposed rectangular cutouts 121, extending across the lower end of the sides of the insertion block 102 and continuing into an integral boss 123 situated at the lower end of the rear face 118 of the body section 102. The block 302 is fixed with its rear face 310 in the plane of the rear vertical face 125 of the boss 123 and with the front face 312 of the mounting block 302 to the rear of the insertion tube 114. Two bolts 306 are mounted in each flange 304 through holes 308 and are threaded into tapped coaxial holes (not shown) within the rectangular cutouts 121 in the inserter body 102. As shown generally in FIGS. 4, 8, and 14, mounting block 302 is provided adjacent the bottom thereof with a rectangularly shaped gripper passage or slot opening 314 which extends between the front and rear faces 312, 310. The front face 312 of the block 302 has a lower curved cutaway section 324 intersecting the gripper passage 314. On both sides of the gripper passage 314 above the cutaway section 324 is a circular hole 318 drilled perpendicularly through the faces 312, 310 for mounting a pair of press fit parallel pins 320 (FIGS. 4 and 9) extending outward of face 312.

The pins 320 journal a pair of identical pivot blocks 322, in a mirror image relationship, directly beneath the insertion tube 114. Each pivot block 322 has a circular mounting hole 330 extending from the front face 338 to rear face 340 in which is a press-fitted coaxial sleeve bearing 332 for journalling the respective pin 320. A boss 328 raised from the outward face 334 of the pivot block 322 and having its rear face coincident with the rear face 340, has a bent rod 326 mounted vertically therethrough with its lower rearwardly extending section 336, beneath each pivot block 322, extending into the cutaway section 324 of the mounting block 302 designed to provide clearance. Welded to the outward face 334 of each pivot block 322 above the boss 328 and adjacent the front face 338 is an abutting plate 342. A rectangular cutout 344 in the centrally converging planar faces 345 and 347 forming the inward face of each pivot block 322 forms a pair of inwardly arranged flanges between which is journalled a roller 346, on a roller pin 348 fitted through coaxial holes 350 in the flanges. These rollers are placed directly below the insertion tube 114.

Bolted to the bottom of each pivot block 322 is a rectangular pivot plate having a flat planar upper surface. The plates are fixed to the pivot blocks 322 so that portions thereof extend inwardly toward each other with the upper planar surfaces in the same plane. The left hand pivot plate 352 (FIGS. 8 and 9) has a retaining finger 354 journalled on its lower face by the shank of a bolt 356 threaded into the bottom surface of the pivot plate 352. A first arm 358 of the retaining finger 354 is located by a short coil spring 360 fixed at one end to the arm 358 and having its second end connected in turn to a pin 362 press fitted into the lower face of the pivot plate 352. A second inwardly positioned arm 364 of the finger 354 has an upwardly extending post 366 fitting in a rectangular space 368 between the opposed pivot plates 352, 370 adjacent the front faces 338 of the pivot blocks 332. The right hand pivot plate 370 has an upstanding integral boss 372 fixed to the upper surface thereof adjacent the rear face 340 and overhanging the inner face of the pivot plate 370 across the intervening space 368. The space 368 formed by the inner face of the pivot plates 352 and 370, the post 366 on the finger 354, and the integral boss 372 on the pivot plate 370, is just large enough to allow the lead wires 16 of a transistor 10 to extend downward between plates 352 and 370 with the overhanging periphery of the lower face of the transistor body 14 supported on the upper surfaces of the plates 352 and 370 while the body 14 of the transistor is longitudinally located between the post 366 on the finger 354 and the boss 372 on the pivot plate 370. The retaining finger 354 may, by means later described, be pivoted clockwise (FIG. 8) to open the forward end of the transistor holding space 368 to permit a transistor 10 to be forced thereinto. After the transistor 10 enters the space 368, the retaining finger 354 is released, and by the action of the spring 360, it is moved back to the position illustrated in FIG. 8 to thereby enclose transistor 10 securely within space 368.

The pivot blocks 322 are interconnected by a coil spring 373 tensioned between the bent ends of the rearwardly extending sections 336 of each bent rod 326 within the cutout 324 in the mounting block 302. The pivot blocks 322 are biased inwardly by the spring 373 in the direction of arrows 374 (FIG. 9) until the pivot plates 352 and 370 are in the same plane, the pivot blocks 322 are adjusted to hold this position by a pair of parallel abutment plates 376 fixed in the rectangular cutouts 121 in each side of the inserter body section 102 ahead of the mounting block 302. Each abutment plate 376 has tapped hole (not shown), having a bolt 378 threaded therethrough with an end thereof adjustably abutting the adjacent abutting palte 342 on the respective pivot block 322, the bolt 378 has a nut 380 fastened tightly thereon, adjacent the outer face of the abutment plate 376, to lock the bolt 378 in place.

The feed mechanism 48', mounted on a channel plate 382 (FIGS. 4 and 7) extending rearward from one side of the rear of the mounting block 302 consists of a cylinder blocks 384 (FIG. 8) and a pair of guide plates 386.

The channel plate 382 is composed of a vertical mounting surface 390 having upper and lower flanges 392 and 394, respectively, formed by bending the upper and lower edges of the sheet metal channel plate 382 horizontally inward. Slots (not shown) cut in the inner end of the channel plate 382 adjacent the upper and lower flanges 392 and 394 define a terminal flange 398, as shown in FIG. 7, which is bent inward at 90° to the vertical mounting surface 390 abutting the rear face 310 of the mounting block 302 and bolted thereto by bolts threaded into tapped holes 402 (FIG. 14) in the rear face 310. The flanges 392 and 394 extend forward of the abutting flange 398 and overlie one side of the top 304 and bottom 316 of block 302 outside of the inserter body section 102 and are affixed to the mounting block 302 by bolts 404 threaded into holes 406 tapped into the top and bottom surfaces of the block 302 (see FIGS. 8 and 14).

The cylinder block 384, bolted to the inner face of the vertical mounting surface 390 of the channel plate 382 has a cover 408. Formed between the mating surfaces of the block 384 and the cover 408 is a passage 410, of circular cross-section, extending the length of the composite member for clamping therein a cylindrical, double-acting, pneumatic actuator or slave cylinder C–20 having a coaxial reciprocating feed rod piston 414 extending out of both ends thereof. A fitting 418 on each end of the slave cylinder C–20 connects the respective ends of the cylinder C–20 alternatively with an air pressure source and a vent by hoses 420. The forward end of the cylinder C–20 lies within the cutout 314 in the lower portion of the mounting block 302 with the axis of the feed rod 414 parallel to the side walls of the cutout 314. The forward end of the feed rod 414 has a pair of opposed flats 416 formed thereon for mounting a pair of cooperating spring gripping fingers 422. Each spring finger 422 has a straight section 424 adjacent the rod 414 for mounting on the flats 416 while at the forward end of each is a semicircular section 426 ending in an outwardly curved tip 428. The curved tips 428 allow the gripping fingers to be cammed apart for the insertion of a transistor body 14 which will then be held in between the pair of semi-circular sections 426 of the pair of gripping fingers 422. The rearward end of the gripper rod 414 has a camming block 430 affixed thereto (FIGS. 4 and 8) by suitable means, not shown. At either side of the feed rod 414 and mounted rigidly on the channel plate 382 of the pair of opposed guide plates 386 cooperate with one side of block 430 to prevent rotation thereof. The upper end of the block 430 is peaked, forming a pair of slanted camming ramps 434. A rod 438 (FIG. 8), rigidly affixed one end thereof to block 430 lies parallel to the axis of the feed rod 414 and extends forwardly through suitable openings provided in block 384 (not shown) to a point approximately even with the semi-circular sections 426 of the gripper fingers 424. A sheet metal cover 440 shielding the exposed elements of the feed mechanism 48 is suitably affixed to the mounting block 302 and the channel plate 382, forming a hollow, substantially rectangular box section therewith.

When a transistor 10 is to be inserted into a circuit board 12, the feed rod 414 is driven forward by air pressure to move the gripping fingers 422 into contact with the transistor 10 to be received from the escapement device in the transistor lead straightening and trimming section 800. As the rod 438 also moves forward, the forward tip of rod 438 pivots the retaining finger 354 clockwise into the open position. The outwardly extending gripper fingers 422, encircling the body 14, of a transistor 10 placed in their path, draws the transistor 10 rearwardly into the space 368 where the body 14 abuts the upstanding integral boss 372. The gripping fingers 422 with the feed rod 414 continue to move rearward spreading slightly to release the now stationary transistor 10 biased against the integral boss 372. With the retreat of the feed rod 414, the rod 438 also moves rearward away from the retaining finger 354, allowing the finger 354 to pivot counterclockwise into a position pocketing the head 16 of the transistor 10. After the transistor 10 is secured in the space 368, the insertion tube 114 is actuated, moving vertically downward over the transistor 10. During the downward movement of the insertion tube 114, the side edges of bottom face thereof abut the rollers 346 of the pivot blocks 322. Thusly, the pivot blocks 322 are pivoted downwardly and apart against the spring 373, releasing the transistor 10 and allowing downward movement therebetween. The insertion tube 114 moves down between the pivot blocks 322 carrying the rtnsistor 10 to a position in which it is fixed in a circuit board 14. After releasing the transistor 10 from the inserter head 100, the insertion tube 114 reciprocates upward to its original position above the pivot blocks 322 which will pivot back into the illustrated position under the impetus of the spring 373.

Figure 15:
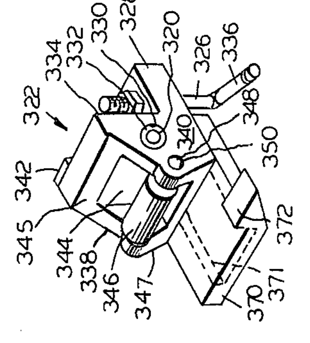
FIGURE 15 is a perspective view of a pivot block with a pivot plate bolted thereto.

In the embodiment of FIGURES 1 and 2, a different arrangement is used to transport the transistors 10 to the inserter head 100. A rectangular slot 371 (shown in phantom in FIG. 15) is milled transversely across both of the pivot plates 352, 370 forming a continuous slot perpendicularly intersecting the space 368 with the rear perpendicular edge of the slot 371 being in the plane of the vertical face of the boss 372. When a transistor 10 is positioned within the space 368, it is held from movement by the front and rear edges of the slot 371 in conjunction with the face of the boss 372. The retaining finger 354 and the finger actuating rod 438, of course, are superfluous and are omitted. Instead of gripper fingers 422, the rod 414 mounts a frame member 44 which in turn carries a pair of parallel shafts 42 slidably located through the holes 318 in the pivot block assembly mounting block 302. A pivot block 322 is journalled on each of the shafts 42 by a pair of snap rings (not shown) on the far side of the block 302. A tie bar (not shown) interconnects the free ends of the shafts 42 holding them parallel and rigid.

When a transistor 10 is to be picked up from the escapement 678, the feed rod 414 is driven forward to move the frame member 44 and the shafts 42 carrying the pivot blocks 322 to a position adjacent the escapement 678. As the pivot blocks 322 approach the escapement 678 a jet of air, as previously explained, blows a transistor 10 from the escapement 678 onto the plates 352, 370 where it is held in the milled slot 371. The feed rod 414 is then retracted carrying the pivot block assembly 300 with its transistor 10 back to a position under the inserter head 100. The short abutment plates 376 of the second species, as shown in FIGURE 4, must be replaced in this embodiment by elongated plates 376′ (as shown in FIGURE 2) so that the pivot plates 352 and 370 can be kept in a horizontal plane during the travel of the pivot block assembly 300 to pick up a transistor 10.

*Transistor magazine mounting section*

Figures 5, 16, 17, 18, 26:
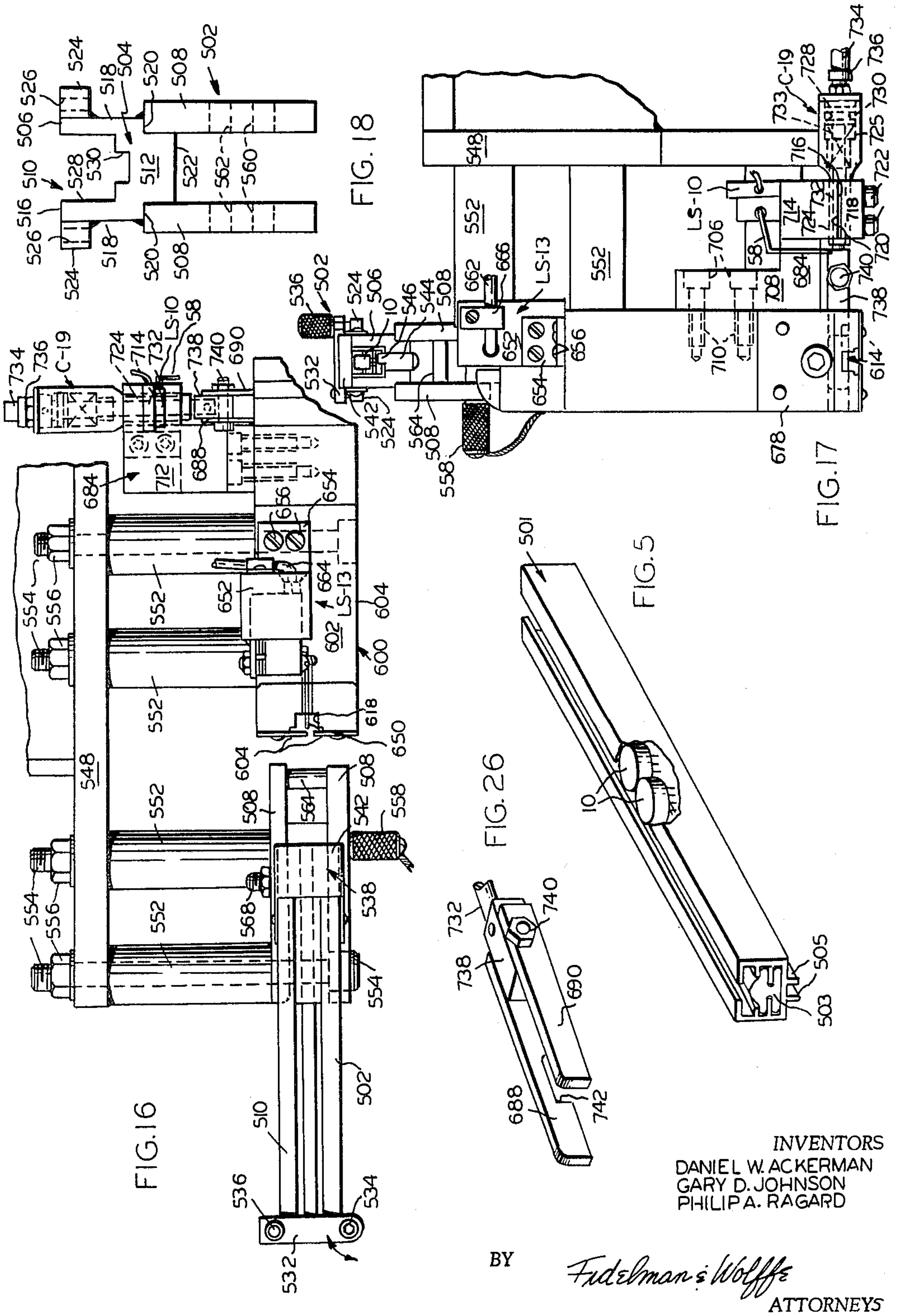
FIGURE 5 is a perspective view of a Texas Instrument Company transistor magazine, one of the many magazine configurations that the present insertion machines can be adapted to handle.
FIGURE 16 is a top plan view of the transistor magazine mounting and chute sections shown in FIGURE 3.
FIGURE 17 is a rear view of the transistor magazine mounting and chute sections as shown in FIGURE 3 further illustrating the configuration of the Texas Instrument magazine holder.
FIGURE 18 is a rear view of the transistor magazine holder of FIGURE 17 with elements removed so that the configuration of the magazine holding slot is evident.
FIGURE 26 is a perspective view of the mounted blades of the escapement shown in FIGURES 3, 16 and 17.

Transistors are packed by each manufacturer in magazines ready for use in particular automatic insertion machines adapted to accept the particular magazine. FIGURE 5 illustrates a Texas Instrument Company plastic magazine 501 packed with TO–4 transistors 10. The transistors 10 are held within the magazine by a shaped plastic plug 503 pressed into each end thereof. Besides the specific length of this magazine, the T.I. device has a pair of depending parallel flanges 505 making it unique in spite of the fact that the included TO–4 transistors are very similar to those of other companies (such as Raytheon). The transistor magazine mounting section 500 consists in part of a magazine holder 502, specially designed to accommodate the T.I. magazines pivotally mounted on the upper end of a magazine mounting plate 550 of the insertion machine 100 (FIGURES 3, 16 and 17). The T.I. magazine holder has a body section 504 consisting of (FIGURE 18) a long rectangular block 506 with a shaped slot 510 cut into the top face 516 parallel to the longitudinal axis of the block and intersecting the front and rear end faces 512, 514, respectively. The shaped slot 510 has a wide upper portion 528 and a lower narrow central portion 530 designed to hold the T.I. magazine tightly in place for proper feeding of the transistors 10. A pair of parallel depending plates 508 are welded in place in rectangular cutouts 520 in the lower portions of the sides 518 of the block 506 extending vertically downward below the bottom face 522 of the block 506 and forward of the front end face 512. A horizontal tab 524, having a central vertical threaded hole 526, is welded to each side face 518 of the block 506 adjacent the rear end face 514 thereof with the upper surfaces of the tabs 524 in the plane of the top face 516 of the block 506. A bar 532, loosely pivoted on one of the tabs 524, by a screw 534 threaded into the respective hole 526, can be swung counterclockwise (FIGURE 16) away from the slot 510 to allow removal of an empty magazine and replacement with a full one and then swung clockwise over the rear end of the magazine. The forward end of the new transistor-filled T. I. magazine 501, replacing an empty one, has the front plastic plug 503 removed after which it is slid under the pivot of a gate 538 journalled over the forward end of the top face 516 of the block 506 by a pair of screws extending through parallel side flanges 540 of the gate 538 and into coaxial tapped holes in the side faces 518 of the block 506. A front flange 542 of the gate 538 snaps resiliently over the front face 512 of the block 506, holding the transistors in the magazine although the front plug 503 has been removed. The knurled thumb screw 536, rotatably carried in the far end of the bar 532 can then be threaded into the hole 526 in the opposite tab 524 drawing the bar down tightly against the top of the T.I. magazine which extends slightly above the slot 510. A rectangular spring finger 544 (FIGURES 3 and 17) is fixed to the bottom face 522 of the block 506 and curves over its front face 512 and into the slot 510 resiliently holding the T.I. magazine against forward or upward movement. The end portion 546 of the spring finger 544, extending into the slot 510, is rectangular in shape, although narrower than the main part of the finger 544 and is offset to the right (as seen in FIGURE 18) so as not to interfere with the leads 16 of transistors 10 moving out of the magazine.

A vertical backing plate 548 fixed also to the far side of the inserter head 100 (FIGURE 16) mounts a parallel adjustable plate 550 by three hollow cylindrical standoffs 552 extending therebetween with their axes perpendicular to the plates 548, 550. Three long bolts 554, extending from the adjustable plate 550, through each hollow standoff 552 and backing plate 548 where a nut 556 is threaded tightly thereon, unite the plates 548 and 558. The depending flanges 508 of the magazine holder 504 straddle the top of the adjustable plate 550 and are journalled thereon by a removable pivot pin 558 fitting through a pair of coaxial passages 560 in the mounting plates 508 and a pivot hole (not shown) in the adjustable plate 550. The pivot pin 558 is held in the composite passage by any one of the many common devices that would allow it to be easily removed, such as a cotter pin, a nut, or a friction detent. A further pair of coaxial holes 562 (FIGURE 18) adjacent the front edges of the flanges 508 mount a cylindrical bridging stop member 564 thereon, while a single tapped hole 566 (FIGURE 19) rearward of the holes 560 and 562, has a pressed ball detent 568 (FIGURES 16 and 19) screwed therethrough with the biased ball 570 extending into the area between the flanges 508.

Figure 22:
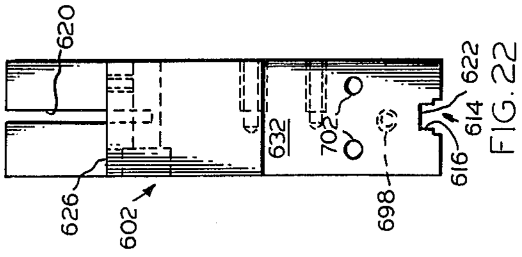
FIGURE 22 is a rear view of the chute block of FIGURE 21, illustrating the shape of the guide slot and the switch arm slot.
Figure 21:
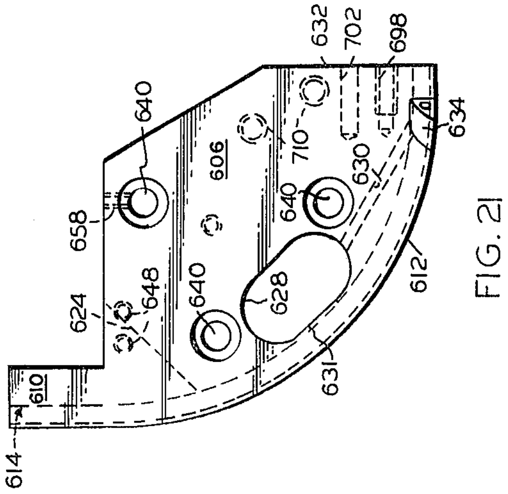
FIGURE 21 is a side plan view of the chute block forming a major part of the chute section shown in FIGURE 3.
Figure 23:
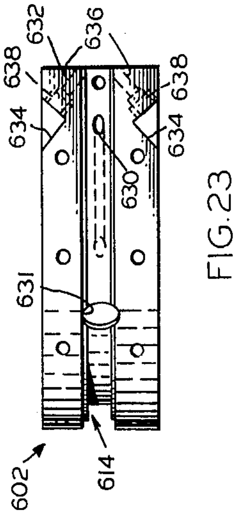
FIGURE 23 is a bottom view of the chute block of FIGURE 21 particularly illustrating the cutouts for the air blow tubes.
Figure 24:
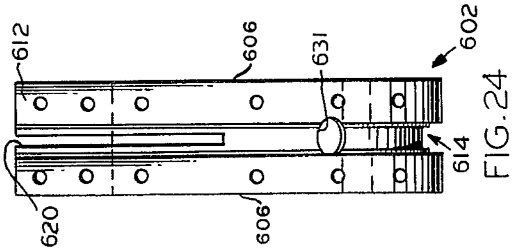
FIGURE 24 is a front view of the chute block of FIGURE 21 particularly illustrating the aperture for removing transistors that bind in the guide slot.

Also fixed relative to the backing plate 548, by standoffs 552, is a transistor chute section, generally designated 600, and comprising in part a chute block, generally designated 602, with an escapement, generally designated 678, fixed adjacent the exit thereof (FIGURES 3, 16, and 17). The chute block 602, per se (FIGURES 21–24) has flat sides 606 and a periphery forming substantially a quarter circle with an integral rectangular portion 610 extending vertically upward adjacent the upper end of the curved periphery and forming a contiguous structure therewith. The chute block 602 has a vertical slot 620 cut into its interior parallel to the side walls thereof intersecting the groove 614 (as shown in FIG. 24) and the horizontal upper face 626. The slot 620 bisects the vertical rectangular portion 610 from front to rear and, in the block 602 itself, it terminates in a wall 624 slanting upward from the curved face 612 to the horizontal upper face 626. A large, generaly elliptical aperture 628, extending completely through the block 602, is connected by means of a long angled cylindrical passage 630, to the inner face 622 of the groove 614 at its exit end near the vertical end wall 632 of the block 602. A short large diameter passage 631 connects the wall of the aperture 628 nearest the groove 614 with the rear face 622 of the groove 614. A pair of angled cutouts 634 in the opposing faces of the block 602, adjacent the groove 614, are connected to the side walls 616 of the groove 614 by a pair of converging cylindrical passages 636 of the block 602. The outer end of each cylindrical passage 636, adjacent the respective cut-out 634, has a countersunk section 638 threaded inward from the cut-out 634. Three countersunk holes 640, through the block 602, seat bolts 554 for mounting the chute block 602 on the backing plate 548 and parallel thereto. Cut into the face 612 of the block 602 (and the rectangular portion 610) is a central transistor guiding groove 614 shaped, in cross-section (FIGURES 22, 23 and 24) like the body of a TO–5 transistor with the upper narrower section of the transistor body corresponding generally to the inner narrower section of the groove 614 defined by walls 616. A pair of parallel runner strips 604 are held by screws to the grooved face 612 in side by side relationship with the outer edge of each strip 604 lying adjacent an edge of the face 612 and with the inner edges of the strips 604 overlapping the groove 614, spaced apart just far enough to allow the three wires of a transistor 10 to extend therebetween unrestricted while holding the transistor body within the groove 614. Thus, the guiding groove 614 and the runner strips 604 form a composite chute 618 (FIGURE 16) for guiding transistors from their magazines 502 to the inserter 100.

When a magazine 501 in the holder 502 becomes empty, the holder 502 may be manually rotated into the horizontal position (as shown in FIGURES 3, 16 and 17) with the bottom face 522 of the holder body section 504 abutting an integral boss 572 on the upper face 574 of the adjustable plate 550. The ball detent 568 is pressed into an indentation (not shown) in the far face of the adjustable plate 550 (FIGURE 3) to prevent accidental movement of the holder 502. The empty magazine 501 may now be removed from the rear end 514 of the holder 504 and a full magazine 501 inserted as previously discussed. The holder 502 can now be pivoted up into the vertical position with the ball detent 568 engaged with another indentation 576 in the far wall of the adjustable plate 550 and the bridging stop member 564 abutting the front end wall 578 of the adjustable plate 550 below the pivot pin 558. With the transistor magazine holder 502 in the vertical position the transistors in the magazine 501 within the holder 502 lie directly above the composite chute 618 in the block 602. By pivoting the gate 538 counterclockwise away from the slot 510, the transistors 10 are released to drop down into the chute 618 of the main chute section 600 (second embodiment) or the upper chute section 601 (first embodiment).

Figure 19:
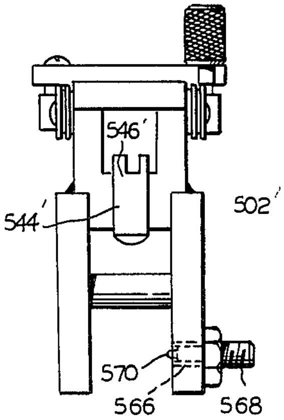
FIGURE 19 is a rear view of a transistor magazine holder adapted to contain a Raytheon transistor magazine.
Figure 20:
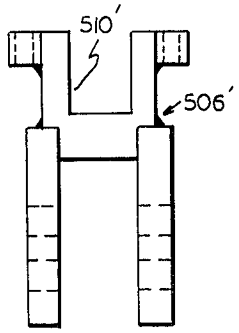
FIGURE 20 is a rear view of the magazine holder of FIGURE 19 with elements removed so that the configuration of the magazine holding slot is evident.

To provide a means for utilizing magazines supplied by companies other than T.I., all that is needed is a distinctly designed magazine holder for each different magazine, the length or configuration of the particular magazine being of little importance. By way of illustration a magazine holder 502′, designed to accept Raytheon magazines, is shown in FIGURES 19 and 20. The slot 510′ is, in this instance, a rectangular shape and the curved end portion 546′ of spring finger 544′ has a pair of parallel tines with a central cut-out. To exchange magazine holders all that need be done is to remove the pivot pin 558, substitute the Raytheon holder 502′ for the T.I. holder 502 and replace the pivot pin 558.

If the head 14 of transistor 10 becomes jammed in the chute 618 because of an uneven surface or incorrect size, it is not required that it be forced down the entire chute length. The jamming transistor 10 need only be driven to the position adjacent the large diameter passage 631 where the transistor 10 may be lifted up through passage 631 and out of the bottom of the elliptical aperture 628.

Resting on the upper edge 626 of the chute block 602, and against the rectangular portion 610, is a transistor sensing switch LS–13 mounted on the block 602 by means of its mounting plate 644 which is secured to the face of the block 602 (FIGURE 3) by a pair of screws 646 threaded into tapped holes 648 in the block 602. A pivoted sensing finger 650, for actuating the switch LS–13, lies within the slot 620, extending into the composite chute 618. As long as transistors 10 are in the composite chute 618, up to the level of the finger 650, the switch LS–13 will be deactivated. When the transistor level drops below the finger 650, an electrical signal will be sent to the control board 26, lighting a warning light 40 which connotes that the magazine is empty or jammed. A hollow rectangular switch cover 652, also resting on the upper edge 626 of the chute block 602, is fastened to the block 602 by an angle brace 654 bolted to the block 602 by screws 656 threaded into tapped holes 658 in the upper edge 626. The switch cover 652 encloses the portion of the switch LS–13 having the electrical contacts 660. A three lead electrical wire 662, from the control board (not shown), enters the cover 652 through a small hole 664 in the side opposite the open end and each wire 662 is soldered to one of the contacts 660. The wire 662 is also held to the outside of the cover 652 by a clamp 666.

Figure 25:
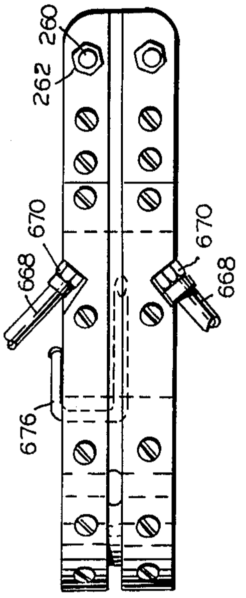
FIGURE 25 is a bottom view of the chute section of FIGURE 3 showing the chute block with the guide strips and air blow tubes attached.

A pair of air hoses 668, having threaded terminal fittings 670, are screwed into the tapped holes 638 in the cut-outs 634 in the sides of the block 602 (FIGURE 25). The hose 668 on the near side (FIGURE 3) is routed through the elliptical aperture 628 to the other hose 668 and a joint source of air pressure. A third hose 672 connected to the same source of air pressure is routed through the aperture 628 and is clamped to the near face of the block 602 along its length by a clamp 674. The visible end of the hose 672 is secured over the end of a piece of copper tubing 676 fitted into the central passage 630 in the block 602. A continuous flow of air under pressure from the tubes 672 and 668 urge the transistors 10 through an escapement 678 bolted to the end wall 632 of the block 602.

In some instances where a long production run is anticipated, the transistor magazine holder 502 may be replaced by a conventional vibratory bowl feed (as disclosed in the copending application Ser. No. 223,572, filed August 10, 1962, in the names of Louis P. Zimmerman and Albert W. Zemek for Transistor Handling Apparatus). The vibratory bowl would be mounted directly behind the upper chute section 601 and would feed directly thereinto.

*The escapement*

The escapement 678 (FIGURES 3, 16, and 17) is composed of: a flat block 680, an L-shaped block 682, and a cylinder mounting bracket 684 holding a slave cylinder C–19 which actuates a pair of escapement blades 688 and 690 held in the blocks 680 and 682. The flat block 680 and the L-shaped block 682 are stacked and bolted in that order over the vertical face 632 of the chute block 602 and the included groove 614, with the foot 692 of the L-shaped block 682 extending away from the chute block 602. The blocks 680 and 682 are held in place by a bolt 694 extending through a countersunk hole 696 in the blocks and into a tapped hole 698 in the face 632 of the chute block 602. A pair of locating pins 700 also extend through complementary holes in the blocks 680 and 682 and are force fitted into coaxially drilled holes 702 in the face 632 of the chute block 602. Both blocks 680 and 682 have longitudinal grooves 614′ corresponding to the groove 614 of the block 602 and function as a continuous extension thereof. The runner strips 604 extend beyond the block 602 and across the bottom of blocks 680 and 682 forming an extension of the composite groove 618. Each of the blocks 680 and 682 has a transverse horizontal milled slot 704 cut into the left hand face thereof (FIGURE 3) across the upper portion of the respective groove 614′, the space between the slots being just wide enough for the body 14 of a transistor 10.

The cylinder mounting bracket 684 is clamped to the rear face of the block 602 (FIGURES 16 and 17) by a pair of bolts 706 extending through an integral flange 708 and into tapped holes 710 in the face of the block 602. The rectangular body 712 of the cylinder mounting bracket 684 is situated perpendicular to the face of the chute block 602 and has a cylinder mounting portion 714. The mounting portion 714 has a substantially semi-circular groove in the bottom face 716 thereof situated with its axis perpendicular to the sides of the block 602. A cover 718, having a matching semi-circular groove in its upper face 720 adjacent the lower face 716 of the mounting portion 714, is secured to the mounting portion 714 by bolts 722 extending through the cover 718 and into the lower face 716 thereof on both sides of the semi-circular groove. Clamped between the semi-circular grooves of the mounting portion 714 and the cover 718 is the necked down end 724 of the escapement actuating slave cylinder C–19.

Within an air chamber 725 in the enlarged head 726 of the cylinder C–19, outwardly of the mounting bracket 684, is a piston 728 with a sealing O ring 730. A coaxial piston rod 732, integral with the piston 728, extends outwardly of the necked down end 724 with a coil spring 733 encircling the end of the rod 732 within the cylinder head 726 and being compressed between an end of the chamber 725 and the piston head 728, biasing the head to the right (FIGURE 17). An air hose 734 has a threaded terminal fitting 736 screwed into a hole (not shown) provided in the end of the cylinder C–19 and connects with the chamber 725. The end of the piston rod 732, extending outwardly of the necked down end 724 of the cylinder C–19, is rigidly mounted in an escapement block 738 which has the pair of escapement blades 688 and 690 rigidly fixed on the opopsite sides thereof by a bolt 740 (FIGURE 26). The escapement blade 688 is reciprocable in the slot 704 in the flat block 680 while the parallel blade 690 reciprocates in the slot 704 in the L-shaped block 682. The longer blade 688 has a notch 742 corresponding in shape to the portion of the chute 618 intersected by the slot 704. In the retracted position, shown in FIGURE 16, the end portion of the blade 688 blocks the chute 618 while the shorter blade 690 lies behind the chute 618 unblocking this end of the passage allowing a trapped transistor 10 between the blades to move out and further down the chute 618 under the impetus of the air from hoses 668 and 672. With the space in the chute 618 between the escapement blades empty, and the subsequent machinery ready for another transistor 10, air pressure through hose 734 will drive the piston 728 forward within the chamber 725 causing the blades 688 and 690 to move forward. Under the urging of the air from tubes 668 and 672 a single transistor 10 moves into the escapement 678 through the opening 742 in the blade 688 and come to rest against the blade 690. As the air pressure in tube 734 is vented the piston 728 retracts, the end of the blade 688 again blocks the chute 618, while the blade 690 no longer blocks the escapement exit. The lately trapped transistor 10 is driven out past the blade 690 by air pressure from the tubes 668 and 672.

*The transistor lead straightening and trimming section*

The transistor lead straightening and trimming section 800 may be mounted on its side above the chute section 600, as shown in FIGURES 1 and 2 or vertically, as shown in FIGURE 4, accepting components from the chute section and feeding them directly to the inserter head 100.

It will be apparent that by curving the transistor guide groove 90° around the upper chute section 601, the transistor lead straightening and trimming section 800 may be mounted sideways in the same plane and the chute section 600 may also be shortened, to bring the mounting section 500 closer to the inserter 100 the overall length of machine 20 may be reduced.

Figure 27:
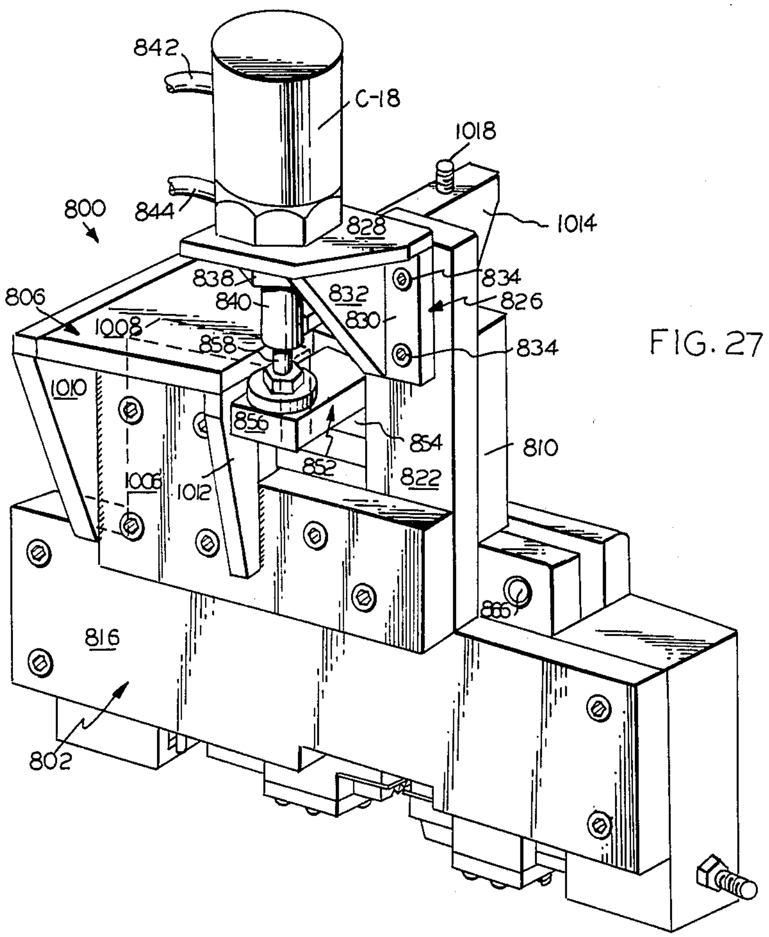
FIGURE 27 is a perspective view of the transistor lead straightening and trimming section as mounted in the insertion machine of FIGURE 3.
Figure 28:
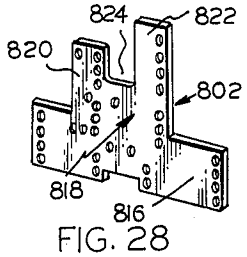
FIGURE 28 is an illustrative view of the main bracket of the transistor lead straightening and trimming section.

Although basically the same unit as used in FIGURE 2 the unit of FIGURE 4 will be herein discussed. As illustrated in FIGURE 27, the main mounting bracket of the straightener section 800 generally designated 802 (shown unencumbered in FIGURE 28) rigidly supports on its front side: a slave cylinder C–18 and a straightener section support bracket 806; and on the rear side (FIGURE 29), a pair of parallel guideways 810, a transistor lead straightening and trimming tool holder 812, and a pair of tool adjustment posts 814. The mounting bracket 802 (shown in FIG. 28) has a wide rectangular base section 816 and bifurcated upper section 818 consisting of a pair of upstanding rectangular legs 820 and 822 forming a slot 824 therebetween.

The slave cylinder C–18 is mounted on the taller leg 822 of the mounting bracket 802 by a weldment 826 having a horizontal slave cylinder mounting surface 828 and a vertical leg 830 connected thereto by a triangular web section 832. Bolts 834 extend through the vertical leg 830 of the weldment 826 and into tapped holes (shown in FIGS. 27 and 29) in the leg 822 of the mounting bracket 802. The piston rod 836 of the slave cylinder C–18 extends below the mounting surface 828 parallel to the bracket leg 822 and spaced therefrom with the slave cylinder C–18 held in place by an encircling nut 838 screw up tightly against the lower face of the mounting surface 828. A coaxial adapter 840 is rigidly pinned to the end of the piston rod 836. A pair of air hoses 842, 844 are fixed to the ends of the cylinder C–18 to drive the included piston (not shown) by air pressure.

The pair of guideways 810 contain between them a reciprocable slide block 846 having a vertical flange section 848 at each side thereof, the flange sections 848 being slidably held under the overlapping inner edges of the ways 810 rigidly held to the mounting bracket 802 by bolts 850. The slide block 846 is operatively connected at its upper end, through the slot 824 in the mounting bracket 802, to the reciprocating piston rod 836 by an angle bracket 852 bolted through its abutting vertical leg 854, to the face of the slide block 846 adjacent the slot 824. The horizontal leg 856 of the angle bracket 852 extends through the slot 824 to a point under the axis of the piston rod 836 at which a threaded rod 858, pinned at its upper end into the adapter 840, the lower end being screwed into a coaxial hole in the horizontal leg 856 of the angle bracket 852 by a pair of nuts 858, one above the leg 856 and one below (not shown).

Affixed by bolts 860 to the lower end of the slide block 846 is a mounting bar 862 pivotly carrying a pair of straightening tool actuating levers 864, journalled by pivot pins 866, between the bifurcated ends thereof. A circular hole 876 is drilled vertically through the solid center section 877 of the bar 862 intersecting the upper and lower faces thereof. The center section 877 of the bar 862 is thicker than the bifurcated ends, being formed in the shape of a cube extending out from the mounting bracket 802. A vertical passage 888, off center from the sides of the cube 877, is formed outwardly of the passage 876.

Centrally mounted beneath the bar 862 on the bracket 802 is the generally rectangular tool holder 812 having a transverse composite transistor guide chute 868 formed in the lower face thereof consisting of a shaped groove 870 and integral extensions of the runner strips 604 of the chute section 600 fastened beneath the holder 812 and overlying the groove 870. The free ends of the strips 604 continue past the transistor lead straightening and trimming station 800 and terminate adjacent the pivot blocks 322 (FIGS. 4 and 8), the ends of the strip 604 being held from extraneous movement between pairs of nuts 262 on each of two parallel vertical threaded posts 260 screwed into a pair of tapped holes in the lower face 119 of the inserter body section 102 ahead of the pivot block assembly 300.

A circular vertical passage 872 (FIGS. 4 and 29) through the top face of the tool holder 812 is coaxial with the hole 876 in the bar 862 and extending to a point adjacent the shaped groove 870, interconnected therewith by a small diameter coaxial passage 874. Slidably mounted in the passage 872 in the holder 812 and extending through the passage 876 in the bar 862 is a transistor clamping rod 878 having a snap ring 880 locked in a groove (not shown) in the upper section of the rod 878 above the bar 862 to prevent the rod 878 from dropping through. A coil spring 882 encircles the clamping rod 878, abutting its upper end against the lower face of the bar 862 and its lower end fitting into the passage 872 and biased against an integral flange 884 on the rod 878 fitting snugly in the passage 872. A coaxial clamping tip 886 of the rod 878, beneath the flange 884 resides in the narrrow diameter passage 874 and is slightly longer than said passage 874.

Figures 31, 33:
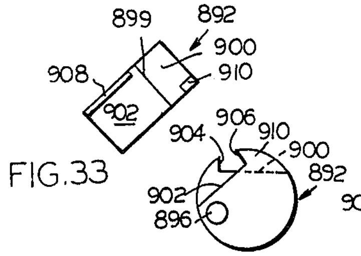
FIGURE 31 is a side plan view of the meter wheel escapement used in the transistor lead straightening and trimming section as shown in FIGURE 29.

The face of the tool holder 812, away from the mounting bracket 802, has a shallow circular aperture 890 formed therein with its axis perpendicularly intersecting the axis of passage 872. The lower portion of the circular aperture 890 intersects the upper portion of the shaped groove 870. A meter wheel 892, rotatably journalled in the circular aperture 890, has a small off center hole 896 drilled therein for journalling the horizontal lower 898 end of a meter rod 894, the upper end of the meter rod 894 being force-fitted into the passage 876 in the center extension 877 of the bar 862. The meter wheel 892 (FIGS. 31–33) besides having an off-center hole 896, has a pair of chordal cutouts 900 and 902 arranged that they intersect at 899 to form an obtuse angle therebetween. Each cut out 900, 902 extends from a point on the circumference of the meter wheel to a second point short of the circumference where it ends in a perpendicular wall 904, 906 respectively forming a pair of flanges 908 and 910 respectively adjacent the opposed faces of the wheel.

Figure 30:
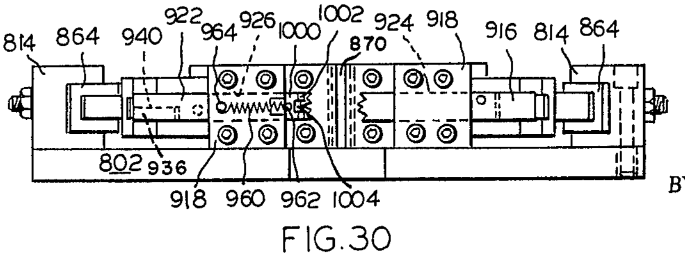
FIGURE 30 is a bottom view of the transistor lead straightening and trimming section as illustrated in FIGURE 29.

The tool holder 812 has a pair of spaced rectangular legs; a short leg 912, and a longer leg 914, extending from the lower face thereof on either side of the groove 870 and the strips 604. The legs 912 and 914 each has a milled rectangular guide slot 924, 926, respectively (FIG. 30), formed from a milled slot extending the entire length of the legs 912, 914 and intersecting the shaped groove 870 at right angles. A straightening tool 916 (FIGS. 29 and 35) slides in the slot in the leg 912 capped over by a plate 918 while a stacked pair of tools including an upper straightening tool 920 (FIGS. 29 and 34) and a lower trimming tool 922 are slidably held in the slot 926 in the leg 914 capped by a second plate 918. If no lead trimming is necessary, the trimming tool 922 may be dispensed with and the leg 914 is shortened to the length of leg 912 with the slot 926 accommodating only a straightening tool similar to tool 920 but without the trimming section 940.

The straightening tool 916 (FIG. 35) consists in part of a body section 970 having, at a first end thereof, an enlarged head portion 932 with an inclined cam surface 934. The other end of the body section 970 has a rectangular cut out 972 in the bottom surface for mounting a pair of identical stacked straightening blades 974 held together by rivets 976 and to the body section 970 by rivets 978. Each blade 974 has a formed end comprising a pair of identical deep V-shaped side grooves 980 and a shallow central V-shaped groove 982. The upper surface of each blade 974 has a number of milled slots, in part, undercutting the grooves 980, 982, as shown in the bottom plan view of FIG. 35. Mounted on the top surface of the tool body section 970 is a rectangular transistor body gripping block 983 fixed loosely by bolts 985 extending through the gripping block 983 and screwed into tapped holes in the tool body section 970. The holes 987 in the block 983 are slightly larger than the shanks 989 of the bolts 985 to provide looseness of fit. The outer end 995 of the gripping block 983 is adjacent the vertical edge 954 of the head 932 with a small coil spring 891 fitting in the end of the block 983 and biased against the vertical edge 954. The inner edge 993 of the block 983 is curved to match the curve of a transistor head 14.

The straightening tool 920 (FIG. 34) consists of a body section 984 having at a first end thereof, an enlarged head portion 986 with an inclined cam surface 935. A side cut out 940 in the first end of the body section 984 intersects the head portion 986 leaving the head portion 986 narrow and off-center. The other end of the body section 984 has a rectangular cut out 988 in the bottom surface for mounting a pair of identical stacked straightening blades 990 held together by rivets 992 and to the body section 984 by rivets 994. Each blade 984 has a formed end comprising a pair of identical shallow V-shaped side grooves 996 and a deep central V-shaped groove 998, the lower surface of each blade 990 has a number of milled slots, in part, undercutting the grooves 996, 998 as shown in the bottom plan view of FIG. 34. A body gripping block 983 is also loosely held to the top surface of the body section 984 and is based outwardly by a coil spring 991 between inner edge 995 of the block 983 and the vertical edge 954 of the head portion 986 of the body section 984.

The trimming tool 922 (FIG. 30) also has an enlarged head portion 936 on the outer end with an inclined cam surface (not shown). On the other end of the tool 922 is a cutting blade 1000 having a pair of identical side cutting edges 1002 and a depressed central cutting edge 1004; the cutting edges 1002 and 1004 being formed by merely tapering the cutting blade end of tool 922 to define sharp edges. The enlarged head 936 of the tool 922 extends upward through the cut out 940 in the head of the straightening tool 920 when slidably mounted in the slot 926. The cut-off tool 922 is biased outwardly by a coil spring 960 connected between a depending post 962 thereon, at the blade end, and a similar post 964 on the cover plate 918.

The oblong adjustment posts 814 are each bolted in a vertical position to the rear face of the mounting plate 802, spaced at the far ends of the lower section 816. Within a hollow in the opposing side of each post 814 is an adjustment lever 924 pivoted at its upper end by a pin 926 mounted in the upper end of the post 814 and having a roller 928 journalled on its lower end within the respective post 814. An adjusting screw 930 extends through the lower end of each post 814, abutting the back of the adjacent lever 924, for positioning its journalled roller 928 inwardly against the adjacent actuating lever 864. The actuating levers 864, mounted on the bar 862, each has a roller 942, journalled by a pin 944 on its lower end on the side adjacent the straightening tool 916, 920 within a cut-out 946.

A pivoted bell crank 948 is journalled between the bifurcated integral ears 950 extending from the far ends of the tool holder 812. A first integral arm 952 of each of the cranks 948 rests on the adjacent roller 942 within the cut out 946 of the adjustment lever 924 while the second integral arm 956 resides behind the vertical edge 954 of the enlarged head 932 of the straightening tool 916, 920.

When a transistor 10 is driven out of the escapement 678 by the jets of air as previously described, it is blown into the tool holder 812 past the mounting plate 802 and abuts the inner flange 908 of the meter wheel as the bar 862 starts to descend, under the action of the slave cylinder C–18. The descending meter rod 894 rotating the meter wheel 892 clockwise (FIG. 26) to close off the interior thereof. As the bar 862 continues to descend, the clamping tip 886 of the rod 878 presses down on the top of the transistor 10 to be straightened within the holder 812, beneath the hole 874.

The actuating levers 864, backed up by roller 928, act on the straightening tools 916, 920 through their journalled rollers 942 abutting the inclined cam surfaces 934 to cam the tools 916, 920 inward to mesh together and straighten the components. As the straightening tools 916, 920 come together, first the gripping blocks locate the head 14 of the transistor 10 therebetween, and second the blades 974 and 990, respectively, interlock with the milled cut out of each blade accommodating the grooved end of the opposing blade forming three composite holes through the four blades. The holes form the apexes of a triangle and are spaced to match the three transistor leads 16.

The trimming tool 922 is then driven inwardly to trim the ends of the leads 16 by the cam action of the adjacent roller 942 against the inclined surface of its enlarged head 936 and is retracted by the action of the extended coil spring 960. As the piston rod 836 in the slave cylinder C–18 retracts, the bar 862 and the actuating levers 864 move upward. The rollers 942 now each abut the first arm 952 of the bell cranks 948 rotating the cranks 948 and causing the second arm of each, lying against the vertical edge 954 of the respective head 932, 986 to drive the tools 916, 920 outwardly out of mesh, freeing the straightened leads 16.

After the leads 16 of the transistor 10 have been straightened and trimmed the bar 862 again rises, releasing the transistor 10 from the clamping rod 878, and rotating the wheel 892 counterclockwise by means of rod 894 to a position in which the flange 908 no longer blocks the groove 870. It will be understood that the lower end 898 of rod 894 is bent at right angles to the upper portion of the rod and that lower end 898 is rotatably received within hole 896 of wheel 892. The air jets blow the straightened and trimmed transistor 10 into the cut out portion of the wheel 892 until its abuts against the far flange 910. When the bar 862 moves down for straightening the next transistor 10, the wheel 892 is again rotated clockwise, moving the flange 910 so as to open the groove 870. The feed rod 414′ and the mounted gripping fingers 422 of the feed mechanism 48 are simultaneously reciprocated into contact with the lead straightened and trimmed transistor 10 to pick up the transistor 10 and carry it back under the insertion tube 114. As the gripping fingers 422 move into the interior of the meter wheel 892 the transistor 10 is abutted against the flange 908 and the gripping fingers 422 continue to advance spreading apart and snapping around the transistor head 14 to hold the transistor 10 securely as it is carried into the inserter 100.

The support bracket 806 used in the second embodiment and illustrated most clearly in FIG. 27 consists of a vertical plate 1006 bolted to the front surface of the mounting plate 802 (FIG. 28) and an upper horizontal plate 1008 extending over the top of the plate 1006, connected thereto by a pair of webs 1010, 1012 welded to both plates. Another web 1014 (FIG. 29) is welded to the horizontal plate 1008, behind the mounting plate 802 and fixed thereto by a bolt 1016. A bolt 1018, extending upwardly through the web 1014 outward of the horizontal plate 1008 is screwed through the bottom surface of the flange 106 (FIG. 6) to connect the transistor lead straightening and trimming section 800 to the inserter section 100.

Figures 29, 34, 35, 36, 37:
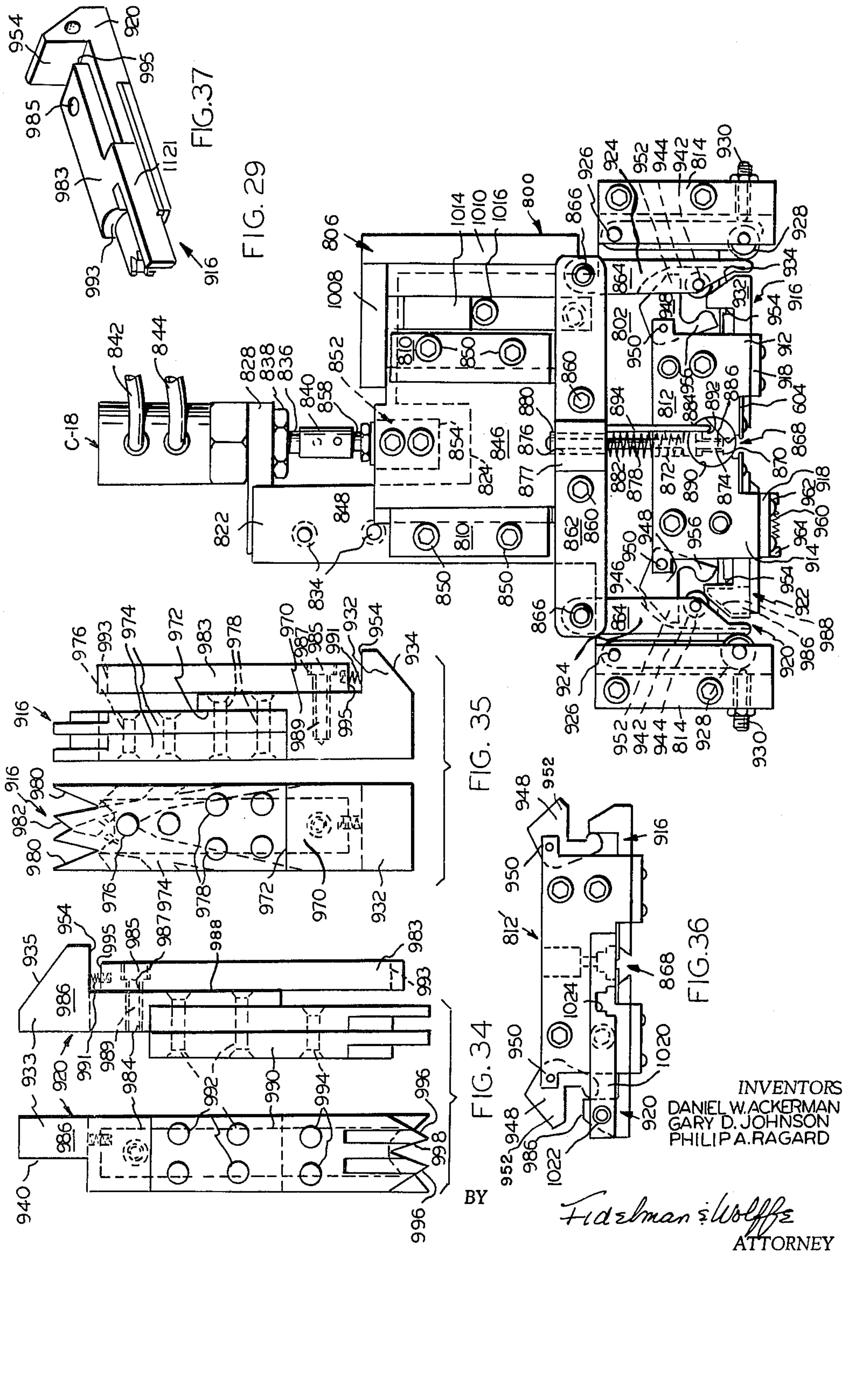
FIGURE 29 is a rear plan view of the transistor lead straightening and trimming section showing the relative positions of the straightening and trimming tools and the actuating levers therefore.
FIGURES 34 and 35 are bottom and side plan views of the transistor lead straightening tools of the transistor lead straightening and trimming section with a transistor head located block mounted on each, particularly illustrating the stacking of, and cutouts in, the tool blades to allow intermeshing thereof.
FIGURE 36 is a side plan view of a simplified tool holder to be used with a transistor lead straightening and trimming section instead of the more complicated tool holder shown in FIGURE 29.
FIGURE 37 is a perspective view of the combination of a transistor head locator block and a pair of escapement blades mounted on the transistor lead straightening tool as shown in FIGURE 35.

A simpler transistor lead straightening and trimming unit 800′ is possible when, as in the embodiment of FIGS. 1 and 2, it is placed on its side with the guide chute extending vertically therethrough and the transistor 10 is allowed to fall freely down out of the straightening unit 800 into the main chute section 600. In a tool holder 812, used with the embodiment of FIGS. 1 and 2, as shown in FIG. 36, the meter wheel 892 and the meter rod 894 have been dispensed with and a pair of escapement blades 1020 substituted therefore. The cut off or trimming blades and function have also been omitted although this is not due to or necessary with the use of a blade type of escapement in place of the meter wheel 892. The blade 1020, similar to the blade 688 of the escapement 678 (FIG. 26) is bolted to the enlarged head 986 of the straightening tool 920 by a bolt 1022 with a space inbetween (not shown). The escapement blade 1020 lies against the outer face of the holder 812', blocking the chute 868. A chute shaped cut out 1024 in the escapement blade 1020 is formed so that when the straightening tool 920 is actuated and driven inwardly the cut out 1024 lines up with the chute 868. The shorter blade 1121, similar to the blade 690 of escapement 678 is formed on side of the gripper blocks 983 mounted on the straightening tool 920 so as to be spaced from the blade 1020 at least the diameter of a transistor head 14.

*The fluid actuating system*

Figure 38:
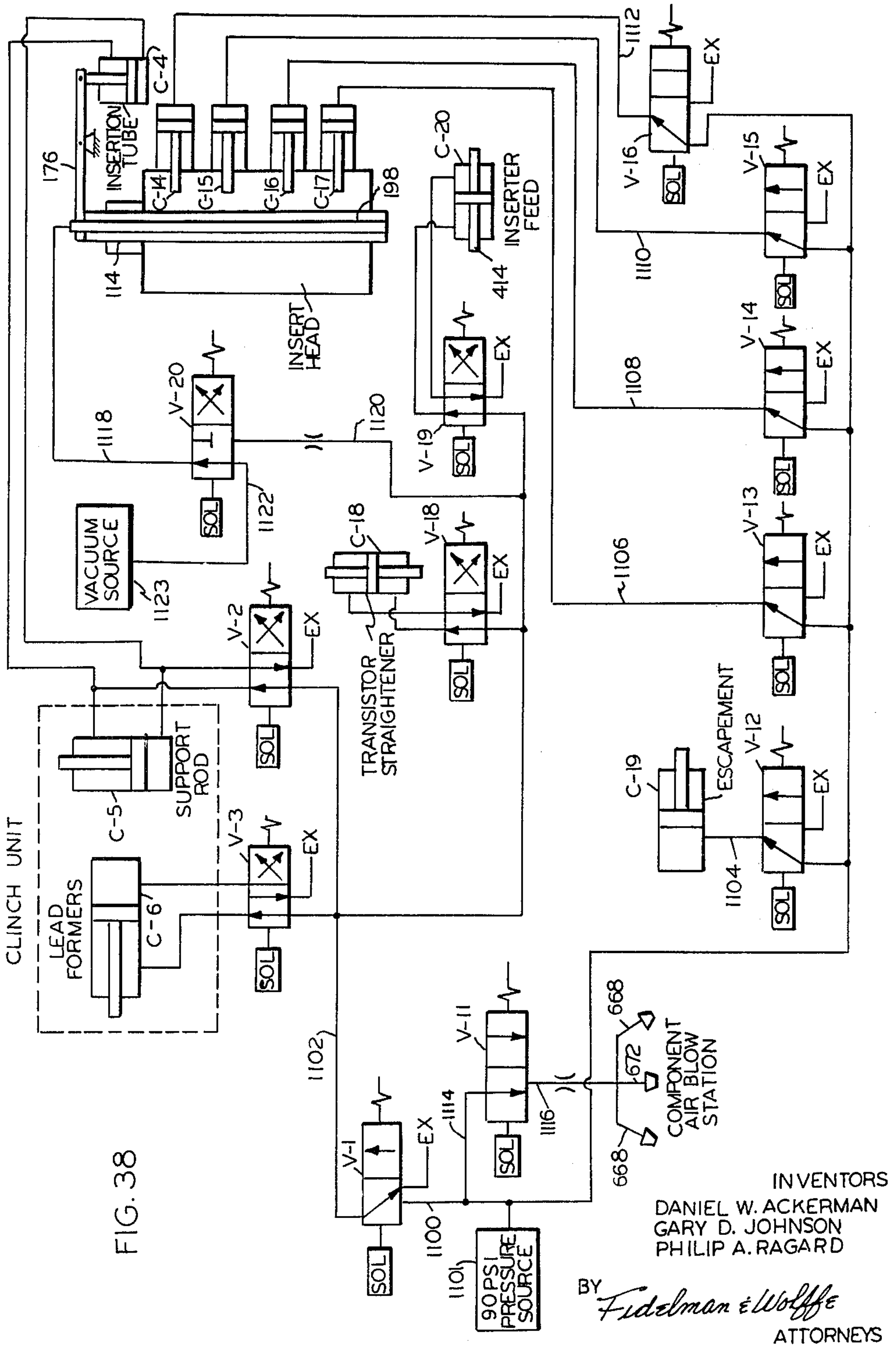
FIGURE 38 is a diagrammatic view of the fluid system for actuating the individual units of the insertion machine.

The individual units or stations of the insertion machine 20, as arranged in FIGS. 1, 2, and 2A, are actuated by air under pressure from a 90 p.s.i. source 1101, as shown in FIGURE 38. An air pressure line 1100 from the source is connected through a solenoid actuated dump air valve V–1, to a line 1102 which is in turn connected to the solenoid actuated air valves V–2, V–3, V–18, and V–19 controlling the slave cylinders C–4 and C–5, C–6, C–18, and C–20, of; the insertion tube 114 and the support rod of the clinch mechanism, the inner and outer lead formers of the clinch mechanism, the transistor lead straightener station 800, and the feed rod 414 of the inserter feed mechanism 48, respectively; and to the line 1120 connected between the line 1102 and the solenoid actuated air valve V–20 controlling the application of vacuum or air pressure to the vacuum tube 198. Also directly connected to the air pressure source 1101 by line 1100 is the solenoid actuated air valve V–11 controlling the admittance of air to the restricted line 1116 which branches out into the component blow tubes 668 and 672 (shown most clearly in FIGURES 3 and 25), and the solenoid actuated air valves V–12 through V–16, controlling the slave cylinders C–19 and C–14 through C–17 for actuating the escapement 678 and the four cam fingers 124 of the inserter body 102, respectively. A vacuum supply line 1122 is also connected to the solenoid actuated valve V–20 directly from a vacuum source 1123.

Valves V–1, and V–12 through V–16, are conventional three-way valves. The dump valve V–1, when in the relaxed condition, with the solenoid deeenergized, vents the line 1102, between the valve V–1 and the various valves V–2, V–3, and V–18, V–19, and V–20, and when the solenoid is energized, the pressure source line 1100 and line 1102 are interconnected. The valves V–12 through V–16 connect the pressure source line 1100 directly to the slave cylinder C–19 of the escapement 678 and the slave cylinder C–14 through C–17 of the cam fingers 124 through pressure lines 1104, 1106, 1108, and 1112, respectively, when the valves V–12 through V–16 are in the relaxed position. When the solenoids of valves V–12 through V–16 are energized, the lines 1104, 1106, 1108, and 1112 are vented. This permits all of the cam fingers 124 to be driven inwardly in case of a monetary power failure so that at least one finger 124 will be in a cam groove in the surface of the insertion tube 114, holding the tube 114 in its proper angular position.

Valve V–11, controlling the component blow station, is a conventional two-way valve blocking the air supply line 1114 in the relaxed position and interconnecting the line 1114 with the blow lines 668 and 672 when the solenoid of valve V–11 is energized.

Valves V–2, V–3, V–18, and V–19, are conventional four-way valves connecting in the relaxed condition, the line 1102, from the dump valve V–1 to the element retracting side of each of the slave cylinders under control, the far side of each of the slave cylinders being vented through the appropriate valve. Upon energization of the solenoid of any one of the last mentioned valves, the element extending side of the appropriate slave cylinder is connected to line 1102 through the valve and the previously pressurized end of the valve is now vented.

Valve V–20 is a conventional four-way valve with the vent port blocked, the adjacent port being connected by line 1118 to the upper end of the vacuum tube 198. One of the opposing ports is connected, through the restricted line 1120, to the pressure supply line 1102 while the adjacent port is connected by line 1122 to the vacuum source 1123. In the relaxed position, the vacuum source 1123 is connected to the vacuum tube 198 through line 1122, valve V–20, and the line 1118, while the restricted pressure line 1120 is blocked. When the solenoid actuator of valve V–20 is energized, the line 1118 is connected to the pressure supply line 1102 through the restricted pressure line 1120 while the vacuum line 1122 is blocked through the valve.

*Electrical sensing system*

Figure 39:
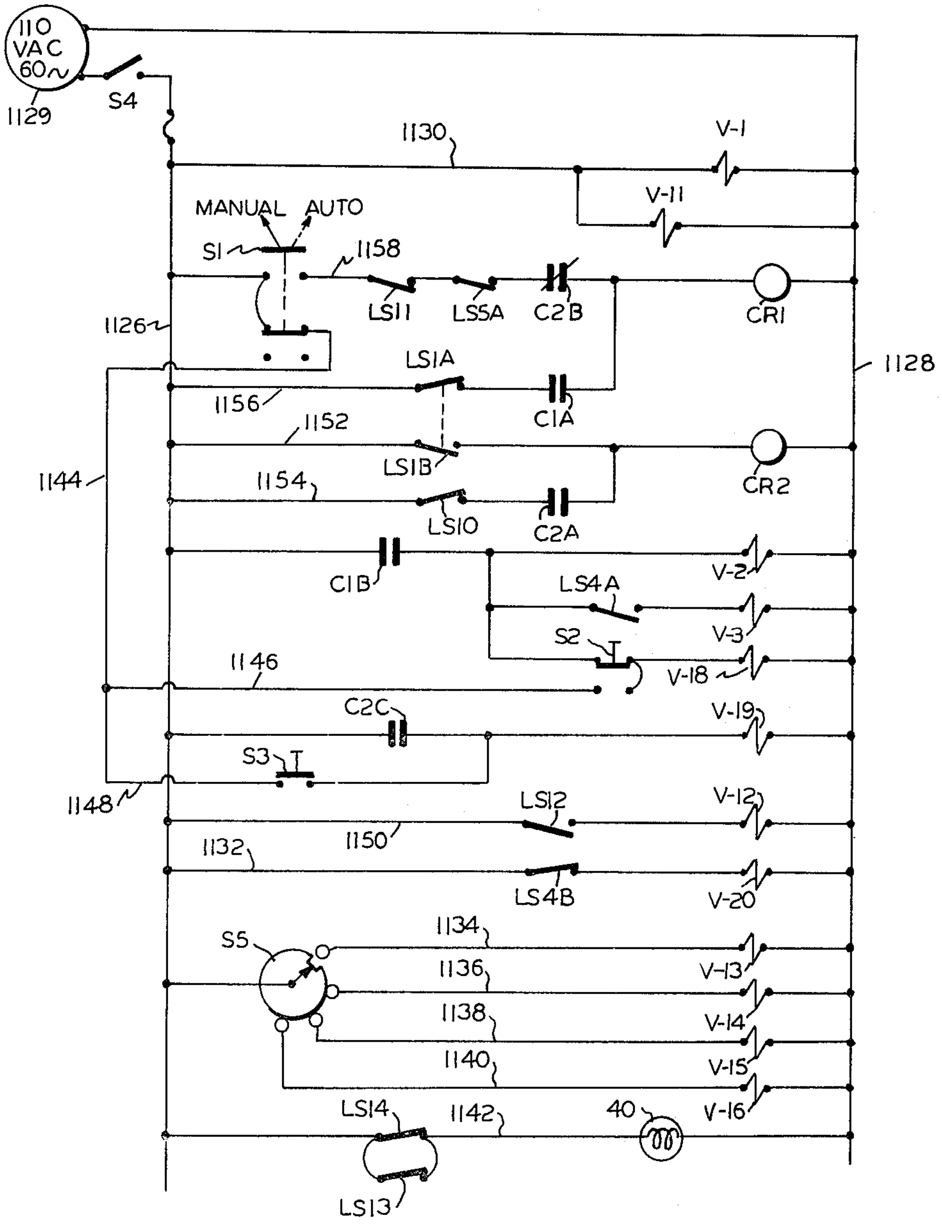
FIGURE 39 illustrates diagrammatically the electrical control system for controlling the fluid system of FIGURE 38.

The electrical circuit for controlling the solenoid actuated air valves uses a 110 volt A.C. 60-cycle, source 1129 for actuating the individual units of the insertion machine 20 in timed relationship by a number of microswitches mounted on the machine in various locations, as shown schematically in FIG. 39. Looking at FIG. 2, a pair of limit switches LS–13 and LS–14 are arranged above and below the straightener unit 800 on the guide chute section 601 and 600 as previously discussed. FIG. 2A illustrates a pair of microswitches LS–4 and LS–5 mounted on the upper surface of the mounting clamp 50 with each having a push button actuator 54, 52 extending upwardly. The microswitch LS–5 is positioned at the rear of the clamp 50 such that when the pivoted lever 176 has completely retracted the insertion tube 114, the rearward end of the lever 176 will depress the push button 52. At the lower limit of travel of the insertion tube 114, the lower surface of the lever 176 abuts the upwardly extending pushbutton 54 of a microswitch LS–4 positioned at the front edge of the clamp 50 ahead of the fulcrum forming flanges 56. Switches LS–11 and LS–12 are fixed to the channel member 382, the switch LS–11 being mounted so as to be actuated by the frame member 44 when the feed rod 414 is in its rearwardmost position and the switch LS–12 mounted so that it is actuated when the feed rod 414 is in its forwardmost position, having driven the pivot block assembly forward until it is adjacent the escapement 678. The switch LS–10 (FIGURES 15 and 17) is mounted on the upper surface of the escapement slave cylinder mounting block 684 has an actuating finger 58 extending downwardly into the path of the outwardly extending bolt 740 of the escapement blade holder 738 so that the switch LS–10 will be actuated in the rearwardmost position of the escapement 678. Switch LS–1 (FIG. 2) is fixed to the frame portion 51 of the clinch mechanism 53, positioned so that the finger 60 thereof is actuated by a plate 55 mounted on the former actuating yoke 57 when the formers are in their uppermost positions having clinched the leads of the transistor 10 being inserted into a board or card 12.

The main difference between the first and second embodiments is the position of the transistor lead straightening and trimming section 800. In the first embodiment, the escapement 678 feeds the transistors 10 to the feed mechanism 48, while in the second embodiment the transistor lead straightening and trimming section 800 receives the transistors 10 from the escapement 678 and meters them to the feed mechanism 48. When adapting the electrical circuitry, the switch LS–12 is rewired to control the solenoid of the air valve V–18 for actuating the slave C–18 of the transistor lead straightening and trimming section 800, while the switch LS–10 now is wired to control the solenoid of the air valve V–12 for actuating the slave cylinder C–19 of the escapement 678.

As seen in FIG. 4, the position of the switch LS–12 has been changed. The switch LS–12 is now mounted on the channel member 382 behind the slave cylinder C–20 of the inserter feed mechanism 48. The cam surface 434, on the delrin block 430 actuates the switch LS–12 when the feed rod 414′ is in its forwardmost position.

Furthermore, the safety switch LS–11 has been omitted to simplify the arrangement without affecting the circuitry in any way.

*Operation*

To start the entire machine in operation, after the aira nd vacuum sources have been turned on, a single pole, single throw main on-off switch S–4 on the control panel 28 (FIG. 1) is closed, applying A.C. current across a pair of parallel lines 1126 and 1128. A circuit is completed at this time through; a line 1130 and a parallel connected solenoid of the dump valve V–1, which applies air pressure to the various air valves V–2, V–3, V–18, and V–19, and the solenoid of the component blow valve V–11, which applies air under pressure to the component blow station; a line 1132, ap air of contact LS–4B of a double pole, double throw microswitch LS–4 and the solenoid of the vacuum control valve V–20, which applies a vacuum to the vacuum tube 198; through a preset rotary switch S–5, and the solenoids of three of the air relay V–13 through V–16, which apply air pressure through the corresponding three lines 1134–1140 to three of the slave cylinders C–14 through C–17, disabling the corresponding cam fingers 124; and if there are no transistors 10 in either of the upper or lower chute sections, through at least one of the parallel connected switches LS–13 and LS–14, line 1142, and the light bulb 40 mounted on the console 32.

A double pole double throw "manual-auto" switch S–1, if set in the manual position (which position is required if the upper chute section 601, the lower chute 600 or the inserter feed are not full), permits the line 1144 to be connected in parallel with the line 1126 through the switch S–1. A circuit may now be completed between lines 1144 and 1128 by depressing one of several pushbuttons. One circuit can be completed through a line 1146 connected in series with the solenoid of the air valve V–18, which applies air to the slave cylinder C–18 of the component lead straightener 800, and through a pair of contacts of an interposed series connected double pole double throw pushbutton switch S–2, when the pushbutton is depressed. When pushbutton S–3 is depressed a circuit is completed through line 1148 pushbutton S–3, the solenoid of the air relay V–20 and limit switch LS–4B whereby air pressure is applied to slave cylinder C–20 for the inserter feed.

The solenoids of valves V–12, V–3 and V–2 of the escapement 678, the clinch mechanism, and the insertion tube 114 cannot be directly actuated. The solenoid of the air valve V–12 is connected between lines 1126 and line 1128 by the series connected line 1150 and the normally open switch LS–12. The normally open contacts C–1B of a triple pole double throw electrical relay CR–1 is connected in series across lines 1126 and 1128 with the parallel connected; solenoid of the air relay V–2 which applies air pressure to the slave cylinders C–4 and C–5 to actuate the insertion tube 114 and the support rod of the clinch mechanism respectively; a pair of normally open contact LS–4A of the double pole single throw microswitch LS–4 and the solenoid of the air relay V–3 which actuates the inner and outer formers of the clinch mechanism; and the pushbutton S–2 (closed in its normally undepressed position) and the solenoid of the air valve V–18 which actuates the lead straightener 800. The solenoid of the air relay V–19 and the normally closed switch contacts LS–5B of the switch 5B are also connected in series with a pair or normally open contacts C–2C of a double pole triple throw electrical relay CR–2 across the lines 1126 and 1128. The solenoid of the triple contact electrical relay CR–2 is connected across lines 1126 and 1128 by parallel connected lines 1152 and 1154; line 1152 having interposed, normally open contacts LS–1B of the microswitch LS–1; and the line 1154 having interposed, in series, normally open contacts C–2A of the electrical relay CR–2 and the normally open contacts C–2A of the electrical relay CR–2 and the normally closed contacts of the microswitch LS–10. The electrical relay CR–1 is connected across the lines 1126 and 1128 by the parallel connected lines 1156 and 1158; the line 1156 containing the series connected normally closed contacts LS–1A of the microswitch LS–1 and the normally open contacts C–1A of the electrical relay CR–1; the line 1158 containing the series connected "auto" contacts of the "manual-auto" switch S1, the normally closed switch LS–11, normally closed contacts LS–5A of the microswitch LS–5, and the normally closed contacts C–2B of the electrical relay CR–2.

*The operation of the machine*

By opening the gate 542 of a transistor holder 502, containing a full transistor magazine 501, the transistor 10 may drop from the magazine 501, down into the upper chute section 601 and into the straightener section 800. The filling up of the upper chute section 601 opens switch LS–13, however, the light 40 remains on due to a parallel current path through the microswitch LS–14, the actuator of which resides in the empty chute section 600. When the "manual-auto" switch S–1 is set in the "manual" position actuation of the pushbutton of switch S–2 cycles the straightener 800 once, the straighteners 800 being manually actuated a number of times to fill the chute section 600. At this time the switch LS–14 is acuated, deactivated the light bulb 40 provided that the upper chute section 601 is still full.

Depressing the pushbutton of switch S–3 momentarily cycles the feed rod 414 once, moving the feed rod toward the escapement 678. As the feed rod 414 approaches the escapement 678, the switch LS–12 closes the contacts thereof completing a circuit through the solenoid of the air relay V–12, cycling the escapement 678 and releasing one transistor 10 through the escapement 678 with the help of the air issuing from tubes 668 and 672 onto the pivot block assembly 300 in the embodiment of FIGURES 1 and 2 and into a position to be picked up by the gripper fingers 422 in the second embodiment. The straightener unit 800 must be cycled once more to refill the chute section 600.

The machine may now be set in automatic operation by repositioning switch S–1 at "auto." Relay CR–1 is energized through the normally closed contacts C–2B of the electrical relay CR–2 and the normally open limit switch contacts LS–5A, the switch LS–5 being cammed closed by the pivot arm 176 of the insertion tube 114 when the tube 114 is in its uppermost position, and the normally open contacts of the cam closed safety limit switch LS–11 cammed by the feed rod 414 when the rod is in its rearwardmost position, out of the way of the insertion tube 114. The energization of the relay CR–1 closes its own contact C–1A and C–1B.

The closing of contacts C–1B causes the energization of the solenoids of the air valve V–2 and V–18. The actuation of air valve V–2 extends the piston of the slave cylinder C–4, pivoting the lever 176 and driving the insertion tube 114 down toward a transistor 10 held by the pivot block assembly 300, the included vacuum tube 198 drawing a vacuum to trap the head 16 of the transistor 10 in its vacuum head 230 and drive the transistor 10 down through the pivot assembly 300 and into the circuit board 12. As the pivot rod 176 is moved by the slave cylinder C–4, the microswitch LS–5 is no longer held depressed and the circuit therethrough is broken, the relay CR–1 being held energized through the parallel line 1156 containing the now closed contacts C–1A. The air valve V–2 also extends the piston of the slave cylinder controlling the support rod of the clutch mechanism causing the support rod to be extended upward. The air valve V–18 extends the piston of the slave cylinder C–18 causing the jaws of the straightening tools 916, 920 to close and the included escapement or meter wheel to open.

When the insertion tube 114 has reached the end of its downward stroke, the forward end of the pivot arm 176 depresses the pushbutton of the switch LS–4 opening the contacts LS–4B and closing the contacts LS–4A. The opening of the contacts LS–4B deenergizes the solenoid of the air valve V–20, causing the vacuum line to be cut off and air under pressure to be applied through the vacuum tube 198 to help release the inserter transistor 10 from the vacuum cup 230. The simultaneous closing of the contacts 4A energizes the solenoid of the air valve V–3 to extend the piston of the slave cylinder C–6, causing the inner and outer formers of the clinch mechanism to rise up and clinch the leads 14 of the transistor 10 against the under surface of the board 12.

When the inner and outer formers of the clinch mechanism have reached the top of their strokes, having performed their functions, the pushbutton of the microswitch LS–1 is depressed opening the contacts LS–1A and closing the contacts LS–1B. The opening of the contacts LS–1A de-energizing the electrical relay CR–1 while the reopening of contacts C1–B de-energizes the air valves V 2, V–3 and V–18 the relaying of these valves causes the insertion tube 114, the support rod and the inner and outer formers of the clinch mechanism, and the transistor lead straghtener 800 to be returned to their home positions. The closing of the contacts LS–1B energizes the electrical relay CR–2 which is held energized by its own, now closed contacts C–2A after the clinch formers start to retract and the switch LS–1 is reclosed.

When the insertion tube 114 reaches its upper position, the rearwardmost end of the pivot arm 176 depresses the switch LS–5, closing the contact LS–5B to energize the solenoid of the feed mechanism air relay V–19 through the closed contacts C–2C of the electrical relay CR–2, causing the feed rod 414 to move toward the escapement 678 to pick up another transistor 10. As the piovt block assembly approaches the escapement 678 the switch LS–12 is closed, energizing the solenoid of the escapement air valve V–12 and opening the escapement 678 to allow a new transistor 10 to be blown out onto the pivot block assembly.

The opening of the escapement 678 also actuates the microswitch LS–10, opening the contacts thereof, and de-energizing the relay CR–2 which opens its contacts C–2A and C–2C and closes contact C–2B. The open contact C–2A holds the relay CR–2 open after the contacts of switch LS–10 reclose. The opening of contacts C–2C de-energizes the solenoid of the feed mechanism straightener valve V–19 to apply air pressure to the slave cylinder C–18 thereof retracting the feed rod 414. As the feed rod 414 starts to retract, the switch LS–12 is released, reopening its contacts and de-energizing the solenoid of the escapement air valve V–12 to retract the piston of its slave cylinder C–19, closing the escapement 678 and releasing the switch LS–10. When the feed rod 414 is completely retracted, with a transistor 10 on its pivot block assembly 300, the safety microswitch LS–11 is actuated, re-energizing the relay CR–1 through the now closed contacts C–2B to start a new cycle.

Therefore a machine has been provided for processing transistors packaged in various magazines or from bowl feeds, including units for lead straightening and for insertion in various angular positions. The units, operating rapidly and efficiently, enable the use of the machine in short or long runs, rather than a line of separate machines.

It will be obvious to those skilled in the art that various changes may be made without departing from the spirit of the invention and therefore the invention is not limited to what is shown in the drawings and described in the specification but only as indicated in the appended claims.

We claim:

1. A device for inserting electrical components into a circuit board consisting of a rigid framework, a component supply means mounted on said framework, means within said framework for withdrawing individual components from said supply and holding such components one at a time above said board, inserting means for removing said one component from said holding means and inserting such component in said board, and means for selectively rotating said inserting means and said removed component simultaneously relative to said framework, said supply and said withdrawing and holding means.

2. A device for inserting electrical components into a circuit board, consisting of, an inserter having a reciprocatable and rotatable cylindrical insertion tube carried therein, means for reciprocating said tube within said inserter, means to hold a component adjacent the lower end of said insertion tube prior to the insertion of said component by said insertion tube into a circuit board disposed therebeneath, means for selectively rotating said tube within said inserter in response to a signal.

3. A device as recited in claim 2, wherein said rotating means consists in part of: a series of cam slots on the cylindrical face of said insertion tube, a cooperating finger in the inserter corresponding to each cam slot, and means for selectively positioning one finger in its respective slot while the remainder of said fingers remain out of the other of said cam slots, whereby said inserter tube will be rotated by said one finger and its respective slot when the reciprocating means is actuated.

4. A device as recited in claim 2 wherein said component holding means includes a pivotable means which is disposed beneath said inserter tube and is adapted to receive an electrical component and hold is securely positioned directly beneath said inserter tube and means for pivoting said pivotable means out of the path of said insertion tube subsequent to the component being held adjacent the lower end of said insertion tube.

5. A device as recited in claim 4 wherein means are provided to guide a component into said pivotable means in a path perpendicular to and intersecting that of said reciprocating insertion tube.

6. A means for inserting electrical components into a circuit board comprising an inserter body, component insertion means within said inserter body, means for reciprocating said insertion means with respect to said inserter body to insert a component, means to selectively rotate said insertion means during reciprocation thereof, whereby a component may be inserted in a number of angular positions.

7. A means for inserting electrical components as recited in claim 6 wherein said component insertion means includes a cylindrical component insertion tube journalled for reciprocation and rotation within said body, and said selectively rotating means includes at least one cam slot provided in the cylindrical surface of said tube and a corresponding extendible cam finger provided one for each cam slot, each said cam finger being slidably mounted within said inserter body and adapted to have one end thereof extended into said cam slot to selectively rotate said component insertion tube, and means are provided for selectively actuating one cam finger to force said end into said cam slot.

8. The means for inserting electrical components is recited in claim 7 wherein said cam slot consisting of an upper section, a central section, and a lower section; said upper and lower sections of said cam slot both extending parallel to the axis of said insertion tube, said upper and lower cam slot sections being displaced from each other along the axis of said insertion tube and angularly displaced from each other a number of degrees equal to the desired rotation of the component being inserted, said central section of said cam slot extending between the lower end of said upper section and the upper end of said lower section.

9. The means for inserting electrical components as recited in claim 8 wherein there are at least two cam slots and an equal number of corresponding extendible cam fingers, said upper and lower cam slots portion of each cam slot being angularly displaced from each other around the circumference of the insertion tube a discrete number of degrees.

10. The means for inserting electrical components as recited in claim 7 wherein there are four discretely shaped cam slots on said cylindrical surface and four cam fingers slidable in said inserter body, each of said cam fingers being adapted to be extended into different one of said cam slots.

11. A means for inserting electrical components into a circuit board comprising: an inserter body; component insertion means within said inserter body; means for reciprocating said insertion means with respect to said inserter body to extend said inserter means to pick up an electrical component and insert said component into a circuit board and to retract said insertion means back into said inserter body after the insertion of a component; and means within said insertion means for gripping said component in the insertion means during the insertion of said component and disassociating said component from the insertion means during the retroaction of said insertion means, said gripping means including a hollow body having a first end and a second end, a component gripping cup associated with said first end, and an air line connected to said second end, and means for connecting said air line to a source of vacuum during a portion of the reciprocation cycle of said tube and connecting said air line to a source of air under pressure during another portion of the reciprocation cycle.

12. The electrical component inserting means as recited in claim 11 wherein said insertion means includes and there is provided means for selectively rotating said insertion tube in discrete increments during a portion of the reciprocation of said tube.

13. The means for inserting electrical components as recited in claim 12 wherein the rotating means consists of at least two cam slots formed in the surface of the insertion tube each cam slot corresponding to a desired angular rotation, a series of cam fingers, one cam finger slidable in the inserter body for each cam slot, each cam finger being adapted to be extended and inserted into a discrete cam slot, means for extending only the one cam finger adapted to be inserted into the cam slot corresponding to the angular position desired.

14. The means for inserting electrical components as recited in claim 13 wherein the means for extending one discrete cam finger into a single cam slot consists of a slave cylinder for each cam finger, air valve means connected to each cam finger slave cylinder an air source, means for actuating each of said air valves, means within said air cylinder for connecting said slave cylinder to said air source through said air valve in the relaxed position of the air valve and connecting said slave cylinder to a vent through said air valve in the actuated position of said air valve, means to simultaneously actuate all but one air valve, said one air valve corresponding to said cam finger to be inserted into the cam slot providing the desired angular displacement when said cylinder is reciprocated whereby a failure of the air relay actuating means will cause all of the cam fingers to extend toward the insertion tube preventing said tube from moving out of registry with the cam finger to be actuated.

15. A feed mechanism for a transistor insertion head having a reciprocating transistor inserting means comprising: a feed rod having an axis disposed perpendicular to said inserting means, means to reciprocate said feed rod along its axis from a retracted position to an extended position; a transistor supporting assembly for supporting a transistor in such a manner that said transistor may be picked up by said inserting means during reciprocation thereof; means for connecting said supporting assembly to said feed rod, said transistor supporting assembly being directly in the path of said transistor inserting means when said feed rod is in said retracted position; a transistor chute means for supplying transistors to said transistor supporting assembly; and escapement having an entrance and an exit, said entrance being arranged adjacent to said chute means, said transistor support assembly being arranged adjacent said exit of said escapement when said feed rod is in said extended position; and means for cycling said escapement once as said support assembly approaches said exit of said escapement for metering one transistor from said chute means onto said support assembly, said support assembly including a pair of pivot blocks having transistor supporting plates, each block being journalled on a pivot block shaft, said pivot block shafts being connected in spaced parallel relationship to said feed rod, abutment means carried on each of said pivot blocks adapted to coact with abutment means carried on said inserter head, resilient means for rotating said pivot blocks into a position in which said pivot block abutment means lie against said insertion head abutment means whereby said pivot block plates lie in the same plane in the retracted and extended positions of said feed rod and form a part of a transistor supporting surface therebetween.

16. An inserter feed mechanism as recited in claim 15 wherein there is a means on each pivot block adapted to be contacted by a lower portion of said inserting means during reciprocation thereof to rotate said pivot blocks outwardly against said resilient means to form a path for said inserting means between said plates on said pivot blocks.

17. An inserter feed mechanism as recited in claim 15 wherein the transistor supporting surface consists in part of a rectangular transistor head holding slot extending transversely across said plates perpendicular to the axis of said feed rod, said plates being arranged to provide an intervening space therebetween for leads of said transistor, and one of said plates is provided with a boss means which extends above the surface thereof and across said intervening space, a face of said boss means being coincident with a side of said rectangular slot whereby the transistor received from said escapement is held with its head in said slot and with the leads thereof extending through said intervening space.

18. A feed mechanism for a transistor insertion head having a reciprocating transistor inserting means consisting of: a feed rod with its axis positioned perpendicular to that of said inserting means, means to reciprocate said feed rod along its axis from a retracted position to an extended position, a transistor gripping means mounted on said feed rod, a transistor support mounted on said inserter head in the path of said reciprocating inserting means for supporting a transistor in a position for said transistor to be picked up by said inserting means during the reciprocation thereof, a transistor chute means for supplying transistors to said transistor supporting means, an escapement having an entrance and an exit, said entrance of said escapement arranged adjacent said chute means, a means for cycling said escapement once as said feed rod is extended and said transistor gripping means on said feed rod approaches the exit of said escapement for metering one transistor from the chute means into the gripping means, means on said transistor supporting means for removing said transistor from said gripping means and placing the transistor on said transistor supporting means prior to the reciprocation of the inserting means.

19. A feed mechanism as recited in claim 18 wherein there is a means actuated by said escapement for controlling said feed rod actuating means to retract said feed rod upon actuation of said escapement.

20. A feed mechanism as recited in claim 19 wherein said transistor supporting means consists of a pair of pivot blocks mounted for pivotable movement about a pair of spaced parallel axes, abutment means mounted on said inserter head adjacent each pivot block, a complementary abutting means fixed to each pivot block, a plate mounted on each block, a resilient means interconnecting said blocks for rotating said blocks into a position in which said complementary abutting means lies against said inserter head mounted abutment means to allow said pivot block plates to be in the same plane forming a portion of a transistor support means with an intervening rectangular space therebetween.

21. A feed mechanism as recited in claim 20 wherein said transistor supporting means consists further of a pivoted lever mounted on one of said pivot plates, said pivoted lever having an upstanding means thereon, means for resiliently holding said pivoted lever in a position with said upstanding means lying within said intervening space, and means on said feed rod for pivoting said pivot lever to remove said upstanding means from said intervening space when said feed rod is in the extended position and said means on said transistor supporting means for removing said transistor from said gripping means extending across said intervening space, the distance between said transistor removing means and said upstanding means when in the resiliently held position, being substantially the diameter of the head of said transistor.

22. A feed mechanism as recited in claim 20 wherein said transistor gripping means consists of a pair of spaced spring fingers mounted on said feed rod by a first end of each finger, each of said fingers having a central gripping portion shaped to conform to a cylindrical head portion of said transistor, the second end of each finger being shaped to cam said fingers apart as said feed rod is extended.

23. A feed mechanism for a transistor insertion head having a reciprocating transistor inserting means and means to reciprocate said inserting means which comprises: a feed rod having its axis disposed perpendicular to that of said inserting means; means to reciprocate said feed rod along its axis from a retracted position to an extended position; a transistor supporting assembly for supporting a transistor to permit said transistor to be picked up by said inserting means during reciprocation thereof; means for connecting said transistor supporting assembly to said feed rod, said transistor supporting assembly being directly in the path of said transistor inserting means when said feed rod is in said retracted position; a transistor chute means for supplying transistors to said transistor supporting assembly; and escapement having an entrance and an exit, said entrance being arranged adjacent said chute means, said transistor support assembly being adjacent said exit of said escapement when said feed rod is in said extended position; means for cycling said escapement once as said support assembly approaches the exit of said escapement for metering one transistor from said chute means onto said support assembly; and safety means controlled by said feed rod for preventing actuation of the means for reciprocating said inserting means until said feed rod is in said retracted position.

24. An insertion machine for inserting transistors into a circuit board from a magazine, each of said transistors having a cylindrical body and a series of parallel leads extending from a face thereof, said insertion machine consisting of a transistor chute having an inlet and an outlet, a transistor magazine holder pivotably mounted adjacent said chute inlet for allowing transistors to fall from a magazine enclosed within said holder into said chute, a transistor lead straightening means mounted on said chute, means for cycling said straightening means to straighten the leads of a transistor moving through said chute, escapement means having an inlet and an outlet, the inlet of said escapement means being mounted adjacent said chute outlet, means to cycle said escapement, a transistor inserter means, reciprocatable feed means for said inserter, means for actuating said feed means to extend said feed means to a position adjacent said escapement outlet to pick up a transistor and to retract said feed means to a position adjacent said inserter means, means for reciprocating said inserter means perpendicular to the direction of movement of said feed means to remove said transistor from said feed means and insert said transistor into a circuit board.

25. The insertion machine as recited in claim 24 wherein means are employed in conjunction with the feed means for controlling said escapement cycling means to cycle said escapement once when the feed means is in the extended position.

26. The insertion machine as recited in claim 25 wherein said means for controlling said escapement cycling means also controls the transistor lead straightening cycling means to cycle said transistor lead straightening means when said feed means is extended.

27. The insertion machine of claim 26 wherein means are provided for controlling said inserter means in conjunction with said feed means when said feed means is in said retracted position to reciprocate said inserter means.

28. The insertion machine of claim 24 wherein there is provided circuit board supporting means, means for actuating said circuit board supporting means, means in conjunction with said inserter means for controlling said board supporting actuating means to cause a board to be supported when said inserter means is reciprocated towards said board, means for clinching the leads of components inserted into said board, means for actuating said clinching means, and further means in conjunction with said inserter means for controlling said lead clinching actuating means.

References Cited by the Examiner

UNITED STATES PATENTS

| | | | |
|---|---|---|---|
| 2,329,047 | 9/1943 | Huelster | 227—114 |
| 2,564,139 | 8/1951 | Ward et al. | 227—116 X |
| 2,896,208 | 7/1959 | Alderman et al. | 227—118 |
| 2,922,163 | 1/1960 | Smick | 227—134 X |
| 3,144,889 | 8/1964 | Cole | 140—140 |
| 3,190,523 | 6/1965 | Van Rijsewijk | 227—117 X |

GRANVILLE Y. CUSTER, Jr., *Primary Examiner.*